(12) United States Patent
Liu et al.

(10) Patent No.: US 12,237,527 B2
(45) Date of Patent: Feb. 25, 2025

(54) ELECTRIC ENERGY STORAGE DEVICE AND ELECTRIC TOOL SYSTEM

(71) Applicant: Globe (Jiangsu) Co., Ltd., Changzhou (CN)

(72) Inventors: Chuanjun Liu, Changzhou (CN); An Yan, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 826 days.

(21) Appl. No.: 17/349,925

(22) Filed: Jun. 17, 2021

(65) Prior Publication Data

US 2021/0313662 A1 Oct. 7, 2021

Related U.S. Application Data

(63) Continuation of application No. PCT/CN2019/114235, filed on Oct. 30, 2019.

(30) Foreign Application Priority Data

Dec. 20, 2018 (CN) .......................... 201811564074.2
Dec. 20, 2018 (CN) .......................... 201811564236.2
(Continued)

(51) Int. Cl.
*H01M 50/00* (2021.01)
*B25F 5/00* (2006.01)
(Continued)

(52) U.S. Cl.
CPC ............. *H01M 50/269* (2021.01); *B25F 5/00* (2013.01); *B25F 5/02* (2013.01); *B25F 5/023* (2013.01);
(Continued)

(58) Field of Classification Search
CPC ........ H01M 50/543; H02J 7/00; H01R 13/05; H01R 13/11; B25F 5/02
See application file for complete search history.

(56) References Cited

U.S. PATENT DOCUMENTS 3,886,426 A 5/1975 Daggett
2011/0250484 A1 10/2011 Meng
(Continued)

FOREIGN PATENT DOCUMENTS

CN 204190691 U 3/2015
CN 107078533 A * 8/2017 ................ B25F 5/00
(Continued)

OTHER PUBLICATIONS

Bakker et al., Power Tool System Incorporating Battery Pack for Use to Supply Power at Different Voltages to Different Tools, Jun. 2018, See the Abstract. (Year: 2018).*
(Continued)

*Primary Examiner* — Anca Eoff
*Assistant Examiner* — Monique M Wills

(57) ABSTRACT

An electric energy storage device comprises four energy units with a same rated voltage and a socket. The four energy units are divided into two energy modules each comprising with two energy units. Each energy module is provided with a positive electrode and a negative electrode. The socket includes four voltage output terminals connected to the positive and negative electrodes of the two energy modules and is provided with two control parts, which respectively control the two energy units in the two corresponding energy modules to switch between parallel state and series state. An electric tool system is also provided, comprising a plug that is connected to the socket, and different plugs can connect the four energy units in different connection states. The electric energy storage device with multiple output voltages (Continued)

can be matched with various electric tools with different rated voltages, and reduces the cost.

6 Claims, 25 Drawing Sheets

(30) Foreign Application Priority Data

| Dec. 20, 2018 | (CN) | ................. | 201811564279.0 |
| Dec. 20, 2018 | (CN) | ................. | 201811566089.2 |
| Dec. 20, 2018 | (CN) | ................. | 201822145919.6 |
| Dec. 20, 2018 | (CN) | ................. | 201822145933.6 |
| Dec. 20, 2018 | (CN) | ................. | 201822146566.1 |
| Dec. 20, 2018 | (CN) | ................. | 201822146585.4 |
| Dec. 20, 2018 | (CN) | ................. | 201822146597.7 |

(51) Int. Cl.

| *B25F 5/02* | (2006.01) |
| *H01M 10/04* | (2006.01) |
| *H01M 10/42* | (2006.01) |
| *H01M 10/46* | (2006.01) |
| *H01M 50/204* | (2021.01) |
| *H01M 50/247* | (2021.01) |
| *H01M 50/269* | (2021.01) |
| *H01M 50/50* | (2021.01) |
| *H01M 50/509* | (2021.01) |
| *H01M 50/519* | (2021.01) |
| *H01M 50/543* | (2021.01) |
| *H01R 13/05* | (2006.01) |
| *H01R 13/11* | (2006.01) |
| *H02J 7/00* | (2006.01) |

(52) U.S. Cl.
CPC ... *H01M 10/0445* (2013.01); *H01M 10/4207* (2013.01); *H01M 10/46* (2013.01); *H01M 50/204* (2021.01); *H01M 50/247* (2021.01); *H01M 50/50* (2021.01); *H01M 50/509* (2021.01); *H01M 50/519* (2021.01); *H01M 50/543* (2021.01); *H01R 13/05* (2013.01); *H01R 13/113* (2013.01); *H02J 7/0024* (2013.01); *H02J 7/0063* (2013.01); *H01M 2220/30* (2013.01)

(56) References Cited

U.S. PATENT DOCUMENTS

| 2012/0133310 | A1 | 5/2012 | Lee |
| 2016/0020443 | A1 | 1/2016 | White et al. |
| 2016/0126533 | A1 | 5/2016 | Velderman et al. |
| 2016/0204475 | A1 | 7/2016 | White et al. |
| 2016/0336558 | A1 | 11/2016 | White et al. |
| 2016/0336559 | A1 | 11/2016 | White et al. |
| 2017/0072553 | A1 | 3/2017 | Bakker |
| 2017/0104243 | A1 | 4/2017 | Velderman et al. |
| 2017/0149372 | A1 | 5/2017 | White et al. |
| 2017/0170671 | A1 | 6/2017 | Mergener et al. |
| 2017/0222454 | A1 | 8/2017 | Bakker |
| 2017/0338452 | A1 | 11/2017 | Varipatis et al. |
| 2018/0076651 | A1 | 3/2018 | Cox et al. |
| 2018/0076652 | A1 | 3/2018 | Cox et al. |
| 2018/0076754 | A1 | 3/2018 | White et al. |
| 2018/0262150 | A1 | 9/2018 | White et al. |
| 2018/0262151 | A1 | 9/2018 | White et al. |
| 2018/0262152 | A1 | 9/2018 | White et al. |
| 2018/0278196 | A1 | 9/2018 | White et al. |

FOREIGN PATENT DOCUMENTS

| CN | 207504590 U | * | 6/2018 | |
| JP | S6424370 A | | 1/1989 | |
| WO | 2018079723 A1 | | 5/2018 | |
| WO | WO2018079722 A1 | | 5/2018 | |
| WO | 2018098628 A1 | | 6/2018 | |
| WO | WO-2018109488 A1 | * | 6/2018 | ............... B25F 5/00 |

OTHER PUBLICATIONS

Bhanuprasad et al., Power Tool System, Aug. 2017, See the Abstract. (Year: 2017).*
Chen et al., A Battery Pack Assembly System And Electric Tool Having The Same, Jun. 2018, See the Abstract. (Year: 2018).*

* cited by examiner

ELECTRIC ENERGY STORAGE DEVICE AND ELECTRIC TOOL SYSTEM

CROSS REFERENCE TO RELATED APPLICATIONS

The present application is a Continuation Application of PCT application No. PCT/CN2019/114235 filed on Oct. 30, 2019, which claims the benefit of CN201811564279.0 filed on Dec. 20, 2018, CN201811564074.2 filed on Dec. 20, 2018, CN201811566089.2 filed on Dec. 20, 2018, CN201811564236.2 filed on Dec. 20, 2018, CN201822146585.4 filed on Dec. 20, 2018, CN201822146597.7 filed on Dec. 20, 2018 CN201822145919.6 filed on Dec. 20, 2018, CN201822146566.1 filed on Dec. 20, 2018, CN201822145933.6 filed on Dec. 20, 2018. All the above are hereby incorporated by reference.

TECHNICAL FIELD

The disclosure relates to the technical field of electric tools, and more particular to an electric energy storage device and an electric tool system using the same.

BACKGROUND

In the garden machinery and electric tool industries, electric tools usually have a rated working voltage, which means electric tools with different voltage platforms require battery packs with different voltages to provide electric. Therefore, different battery packs need to be prepared to adapt to electric tools with different rated voltages, which causes a high cost and a waste of resources.

Therefore, it is necessary to provide an improved electric energy storage device and an electric tool system using the same to solve the above problems.

SUMMARY

An object of the disclosure is to provide an electric energy storage device with three kinds of output voltages and an electric tool system using the electric energy storage device.

To achieve the above object, the disclosure provides an electric energy storage device, comprising four energy units with a same rated voltage, wherein the four energy units are divided into two energy modules, each energy module is provided with two energy units, and each energy module is provided with a positive electrode and a negative electrode, the electric energy storage device is provided with a socket, and the socket includes four voltage output terminals connected to the positive and negative electrodes of the two energy modules, the socket is also provided with two control parts which respectively control the two energy units in the two corresponding energy modules to switch between parallel state and series state.

In an embodiment, the control part is provided with two parallel switches and one series switch, the parallel switches connect the two energy units in the corresponding energy module in parallel, and the series switch connects the two energy units in the corresponding energy module in series, in a initial state, one kind of the parallel switches and the series switch is conductive, and the other kind is disconnected.

In an embodiment, the four voltage output terminals are arranged in two rows and two columns in up and down or arranged in two rows and two columns in front and rear, and the polarities of two voltage output terminals located in a same column are the same; or the four voltage output terminals are arranged in one row.

In an embodiment, all the parallel switches and all the series switches of the two control parts are arranged in a row; or all the parallel switches and all the series switches of the two control parts are arranged in multiple rows.

In an embodiment, each of the parallel switches or the series switch is provided with two parts separated from left to right, and each part is provided with a contact arm, two contact arms of the parallel switch or the series switch in the conductive state are in contact to each other, two contact arms of the parallel switch or the series switch in the disconnected state are separated from each other.

In an embodiment, the two parallel switches of each control part are located in a same column, or the four parallel switches of the two control parts are located in a same column, or the two parallel switches and the series switch of each control part are located in a same column; or the four parallel switches and the two series switches of the two control parts are all located in a same column.

An electric tool system is provided, comprising the electric energy storage device according to any one above and a plug connected to the socket, wherein the plug is provided with several connecting pieces connected to the four voltage output terminals to connect two energy modules in parallel or series.

In an embodiment, one kind of the parallel switches and the series switch is a normally closed switch, and the other kind is a normally open switch, the plug is provided with a switching part matching with the control part, and the switching part includes an insulating part corresponding to the normally closed switch and a conductive part corresponding to the normally open switch, the insulating part disconnects the normally closed switch, and the conductive part turns on the normally open switch to switch the connection state of the two energy units in the energy module.

In an embodiment, the plug includes several conductive parts, the several conductive parts are arranged in an integral structure, and an insulating separating part is provided between adjacent conductive parts.

In an embodiment, the conductive part and the insulating part of the switching part corresponding to the same control part is arranged in an integrated structure; or the conductive part or the insulating part of the plug corresponding to the different control part is arranged in an integrated structure; or all the conductive parts and all the insulating parts of the switching part corresponding to the two control parts are arranged in an integral structure.

In an embodiment, the plug includes two connecting pieces, each connecting piece is in contact with the two voltage output terminals with a same polarity, and the connecting pieces are in a single-piece structure or a double-contact arm structure.

In an embodiment, the plug includes three connecting pieces, one of the connecting pieces is provided with a double contact arm and is respectively in contact with the two voltage output terminals with different polarities corresponding to different energy modules, and the other two connecting pieces are in contact with the other two voltage output terminals.

An electric tool system is provided, comprising the electric energy storage device according to any one above, a low-voltage electric tool provided with a low-voltage plug which is connected with the socket to make the four energy units in a full parallel state, a medium-voltage electric tool with a medium-voltage plug which is connected with the socket, so that each two of the four energy units are series connected first and then parallel connected therebetween or each two of the four energy units are parallel connected first and then series connected therebetween; and a high-voltage electric tool with a high-voltage plug which is connected with the socket to make the four energy units in a full series state.

The electric energy storage device of the disclosure can output several kinds of voltages, which can be matched with multiple kinds of electric tools with different voltages, increase the adaptability of the electric energy storage device and reduces the cost.

DETAILED DESCRIPTION

Figure 1:
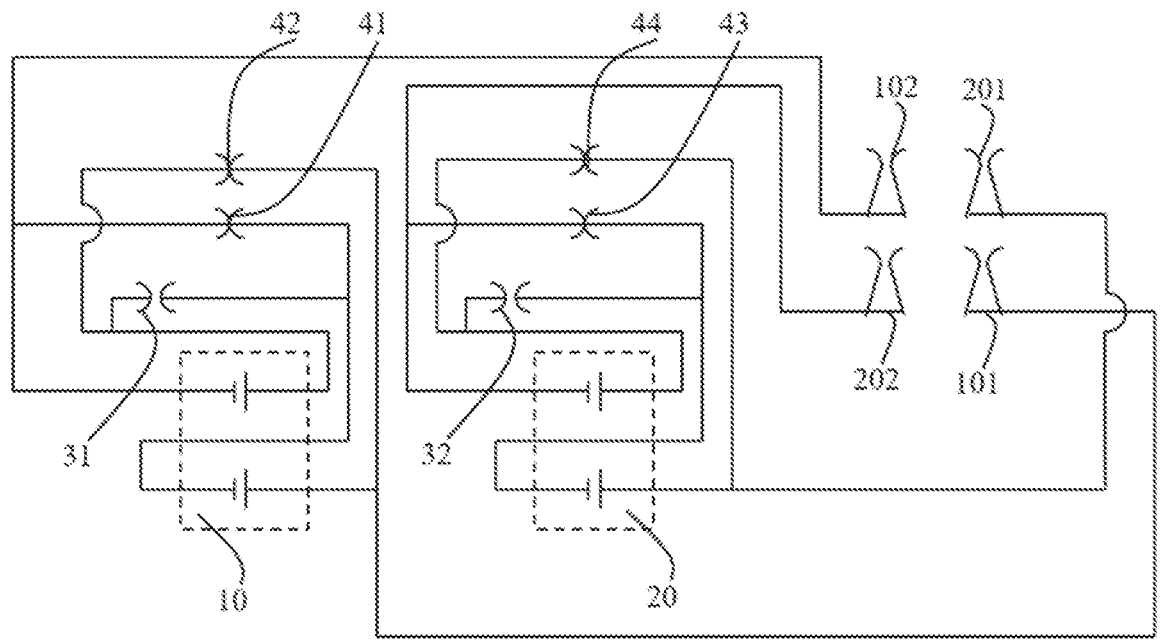
FIG. 1 is a schematic view of a connection of four energy units of an electric energy storage device, according to a first embodiment.

In order to make the objectives, technical solutions, and advantages of the disclosure clearer, the disclosure will be described in detail below with reference to the drawings and specific embodiments.

It should be noted that, in order to avoid obscuring the disclosure due to unnecessary details, only the structure and/or steps closely related to the solution of the disclosure are shown in the drawings, and other details which are not related to the disclosure are omitted.

In addition, it should also be noted that the terms "including", "comprising" or any other variation thereof means non-exclusive inclusion, so that a process, method, article or equipment not only includes those elements, but also includes other elements that are not explicitly listed, or also includes inherent elements of the process, method, article, or equipment.

The disclosure provides an electric energy storage device, which includes four energy units with equal voltage. The four energy units can provide three kinds of output voltages through combination of series and parallel. The energy unit refers to an object that can provide electric energy, such as batteries, lithium batteries or other energy carriers. Of course, multiple batteries can also be electrically combined to form an energy unit. The batteries include, but are not limited to, rechargeable batteries such as lithium batteries, nickel-metal hydride batteries, and nickel-cadmium batteries. The rated voltages of the four energy units are all nV. It should be noted that a measured voltage of n±5% V per energy unit can be regarded as equal.

The four energy units of the disclosure are equally divided into two energy modules. The circuit connection between the two energy units in each energy module provides two optional states: parallel and series connection states. The circuit connection between two energy modules also provides two optional states: parallel and series connection states. Therefore, there are four connection states of the four energy units of the electric energy storage device: 1. The two energy units in the energy module are connected in parallel, and the two energy modules are also connected in parallel, so that all four energy units are connected in parallel. This state can refer to as a full parallel state, and the output voltage is nV. 2. The two energy units in the energy module are connected in series, and the two energy modules are also connected in series, so that all four energy units are connected in series. This state can refer to as a full series state, and the output voltage is 4*nV. 3. The two energy units in the energy module are connected in series, and the two energy modules are connected in parallel. This state can refer to as the internal-series and external-parallel state, and the output voltage is 2*nV. 4. The two energy units in the energy module are connected in parallel, and the two energy modules are connected in series. This state can refer to as the internal-parallel and external-series state, and the output voltage is also 2*nV. The third and the fourth output voltages are equal to each other, so the electric energy storage device can output three kinds of rated voltages. In addition to an initial connection state, other connection states can be switched by the corresponding plugs. Please note that in any of the connection states mentioned above, all energy units are engaged in operation.

The specific embodiments of the disclosure will be described below with reference to the drawings.

First Embodiment

Figure 2:
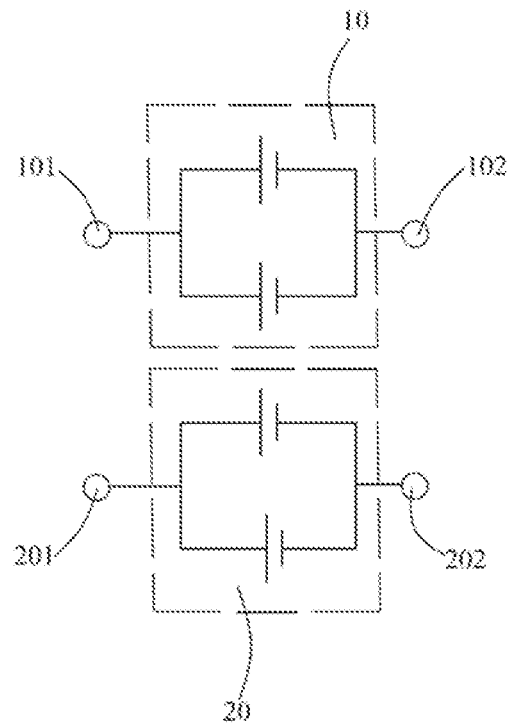
FIG. 2 is a schematic view of an initial circuit connection of the four energy units of the electric energy storage device, according to the first embodiment.

Please refer to FIG. 1 and FIG. 2. In the first embodiment, the four energy units of the electric energy storage device are divided into a first energy module 10 and a second energy module 20, and each energy module 10, 20 includes two energy units.

Each energy module 10, 20 is provided with a positive electrode and a negative electrode. The electric energy storage device is provided with a socket (not shown). The socket includes four voltage output terminals corresponding to each electrode, and four voltage output terminals are respectively: a first positive terminal 101 connected to a positive electrode of the first energy module 10, a first negative terminal 102 connected to a negative electrode of the first energy module 10, a second positive terminal 201 connected to a positive electrode of the second energy module 20, and a second negative terminal 202 connected to a negative electrode of the energy module 20 of the second energy module 20. It is understandable that the serial-parallel connection state between the two energy modules 10 and 20 can be controlled through controlling the connection mode among the four voltage output terminals, and the connection mode of the four voltage output terminals can be determined by the corresponding plug, this part will be detailed later.

The socket (not shown) of the electric energy storage device also includes two control parts corresponding to the energy modules 10 and 20, the two control parts include a first control part and a second control part, which can respectively control the serial-parallel connection state of the two energy units in each energy module 10 and 20. The control part can be controlled and switched by a switching part of the plug. This part will be detailed later.

The first control part includes a first series switch 31, a first parallel switch 41 and a second parallel switch 42. The second control part includes a second series switch 32, a third parallel switch 43 and a fourth parallel switch 44. The connection between each control part and the two energy units in the energy modules 10 and 20 is the same. The following takes the first control part as an example for description All of the first series switch 31, the first parallel switch 41, and the second parallel switch 42 of the first control part include two contact parts (not numbered) connected to the electrodes of the energy unit, the two contact parts of the first parallel switch 41 and the second parallel 42 switch are respectively connected to the electrodes with the same polarity of the two energy units of the energy module 10, as shown in FIG. 1, for example: the two contact parts of the first parallel switch 41 are respectively connected to the negative poles of the two energy units, the two contact parts of the second parallel switch 42 are respectively connected to the positive poles of the two energy un its. The two contact parts of the first series switch 31 are respectively connected to the electrodes with opposite polarities of the two energy units, and the other two electrodes with opposite polarities of the two energy units are respectively connected to the voltage output terminals 101 and 102 mentioned above. When the first parallel switch 41 and the second parallel switch 42 are turned on, the two energy units in the energy module 10 can be connected in parallel, and when the first series switch 31 is turned on, the two energy units in the energy module 10 can be connected in series.

Correspondingly, when the third parallel switch 43 and the fourth parallel switch 44 are turned on, the two energy units in the energy module 20 can be connected in parallel, and when the second series switch 32 is turned on, the two energy units in the energy module 20 can be connected in series.

In this embodiment, the four parallel switches 41, 42, 43, 44 are normally closed switches, and the two series switches 31, 32 are normally open switches, which means that, in the initial state, the parallel switches 41, 42, 43, 44 are in conductive state, the series switches 31, 32 are in disconnected state, and the two energy units in each energy module 10, 20 are connected in parallel, as shown in FIG. 2.

Figure 3:
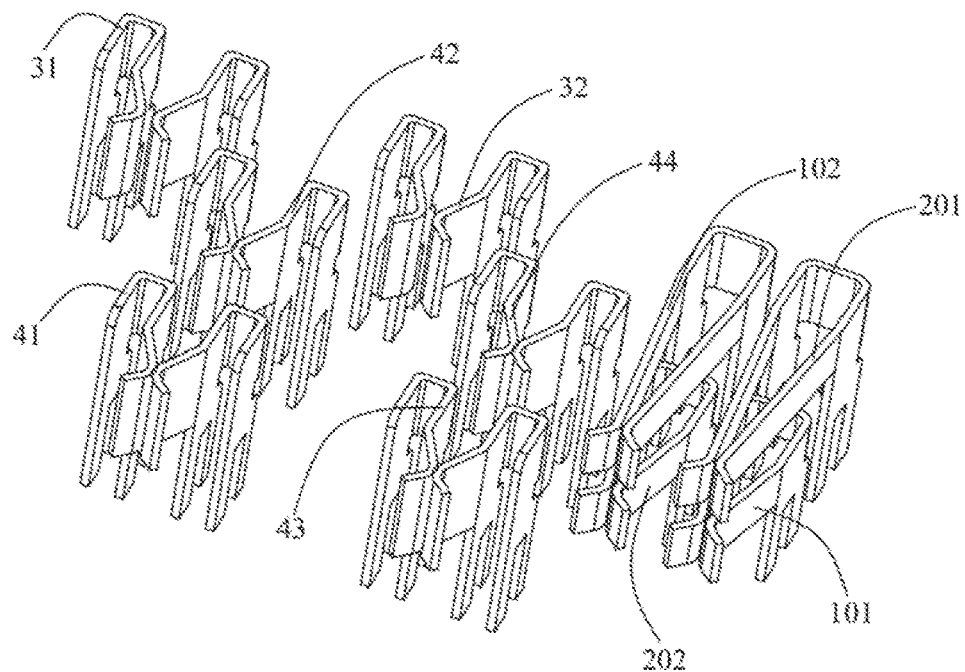
FIG. 3 is a terminal arrangement view of the electric energy storage device, according to the first embodiment.

The following describes a terminal structure of the parallel switches and the series switches combined with FIG. 3. The structure of the two switches is basically the same. Each switch includes two parts on the left and right arranged at intervals and each part includes a main body and a contact arm extending forward from the main body. The two contact arms form a contact part. The cross section of the main body is n-shaped and is provided with downwardly extending connecting pins for connecting with the positive and negative electrodes of the energy unit. In this embodiment, the parallel switches are normally closed switches, that is the two contact arms of the parallel switches are in contact with each other and in conductive state; and the series switches are normally open switches, that is the two contact arms of the series switches are not in contact to each other and in disconnected state.

In this embodiment, the first series switch 31 of the first control part is arranged in one row, and the first and second parallel switches 41, 42 are arranged in a front-to-back alignment in another row. Similarly, the second series switch 32 of the second control part is separately arranged in one row, and the third and fourth parallel switches 43 and 44 are arranged in a front-to-back alignment in another row. The two control parts are arranged side by side. The specific arrangement is, from left to right, the first series switch 31, the first and second parallel switches 41, 42, the second series switch 32, and the third and fourth parallel switches 43, 44.

It should be noted that the series switches and the parallel switches in this embodiment can be arranged according to needs, and should not be limited to this. For example, four parallel switches 41, 42, 43, 44 can be arranged in one row, and two series switches 31, 32 can be arranged in one row; or the four normally closed switches 41, 42, 43, 44 and two normally open switches 31, 32 of the two control parts are arranged in a row; or the parallel switches 41, 42, 43, 44 are arranged in one row, and the two parallel switches 31, 32 are arranged in two rows; or the four parallel switches 41, 42, 43, 44 of the two control parts are arranged in pairs in one row, and the two parallel switches 31, 32 are arranged in one row; or the two parallel switches 41, 42 and the parallel switch 31 of the first control part are arranged in one row, and the two parallel switches 43, 44 and the parallel switch 32 of the first control part are arranged in another row. In one word, there are various kinds of arrangement of parallel switches and series switches of the electric energy storage device, which are not listed here. Those skilled in the art should understand that the changes of the arrangement are all within this disclosure.

In this embodiment, the four voltage output terminals 101, 102, 201, 202 are divided into two rows and two columns and are arranged near the outermost ends of the third and fourth parallel switches 43, 44, which are respectively a second positive terminal 201 located in the upper row of the outermost column, a first positive terminal 101 located in the lower row of the outermost column, a first negative terminal 102 in the upper row of the inner column, and a second negative terminal 202 in the lower row of the inner column, so that the polarities of the voltage terminals in the same row are the same. Each voltage terminal 101, 102, 201, 202 includes a pair of contact arms, and contact arms located in the upper row extend forward to directly above the contact arms in the lower row so as to be in contact to the same corresponding connecting piece.

When the socket of the electric energy storage device of the disclosure is connected with the plug of the electric tool, its four voltage output terminals 101, 102, 201, 202 can be connected in different ways so that the two energy modules 10, 20 can be connected in series or in parallel. The state of the series switches 31, 32 and parallel switches 41, 42, 43, 44 of the control part can be selectively switched, so that the connection of the energy units inside the energy modules 10 and 20 are switched from the initial parallel state to the series state. The following will be described in combination with the figures.

Figure 4:
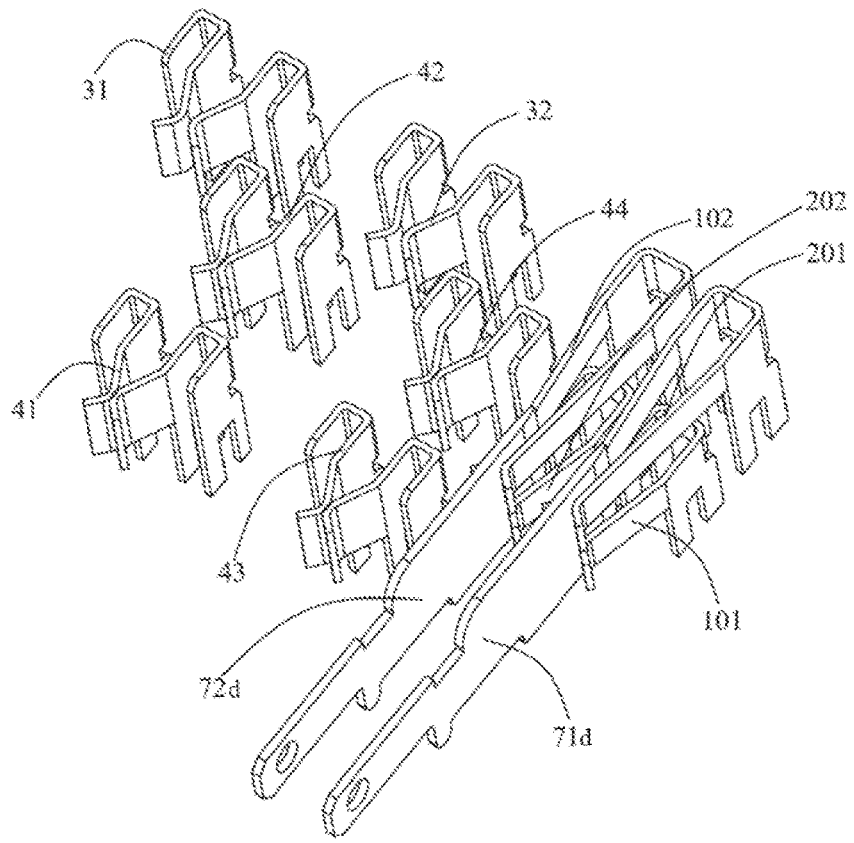
FIG. 4 is a schematic view of a structure of the electric energy storage device when matched with a low-voltage plug, according to the first embodiment.
Figure 5:
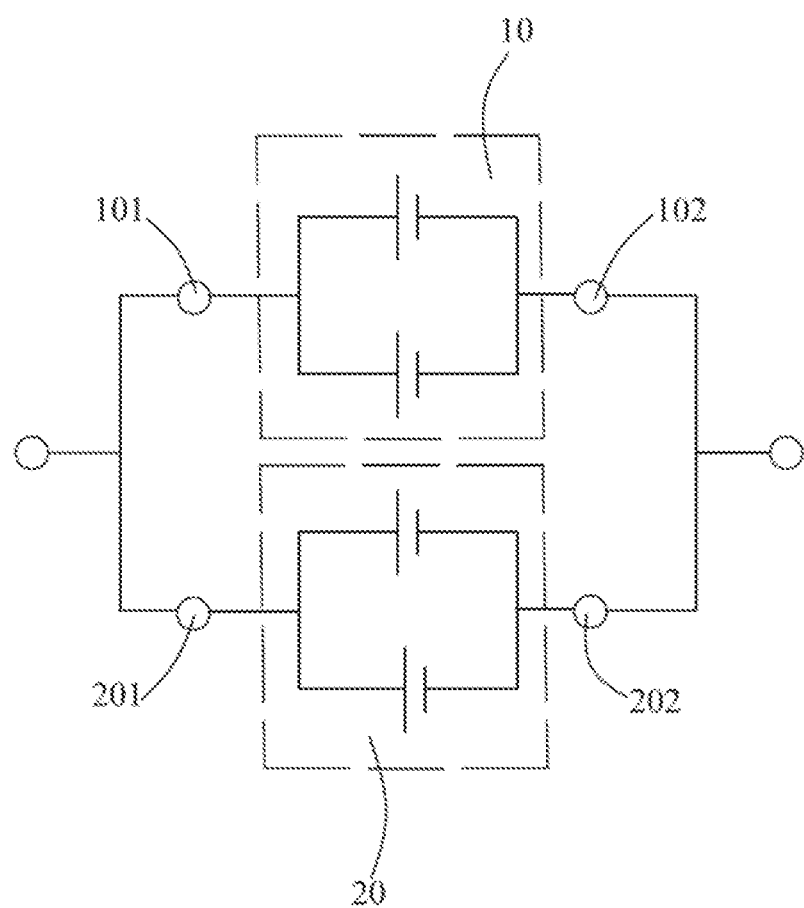
FIG. 5 is a schematic view of a circuit of the electric energy storage device when matched with a low-voltage plug, according to the first embodiment.

Please refer to FIG. 4 in combination with FIG. 1, a low-voltage electric tool (not shown) is provided with a low-voltage plug (not shown) that is matched with the socket of the electric energy storage device and its working voltage of is nV. The low-voltage plug is provided with two monolithic connecting pieces 71d and 72d. The two connecting pieces 71d and 72d are respectively connected to two of the four voltage terminals with the same polarity. In this embodiment, when the low-voltage plug is connected with the socket, the first connecting piece 71d is simultaneously connected with the first positive terminal 101 and the second positive terminal 201 in the outermost column, and the second connecting piece 72d is simultaneously connected with the first negative terminal 102 and the second negative terminal 202 in the inner column, so as to connect the two energy modules 10, 20 of the electric energy storage device in parallel. These two connecting pieces 71d and 72d simultaneously serve as voltage input terminals of the low-voltage plug. The two energy units in each energy module 10, 20 are connected in parallel through the control part, and the electric energy storage device outputs low voltage of nV. The corresponding circuit diagram is shown in FIG. 5.

Figure 6:
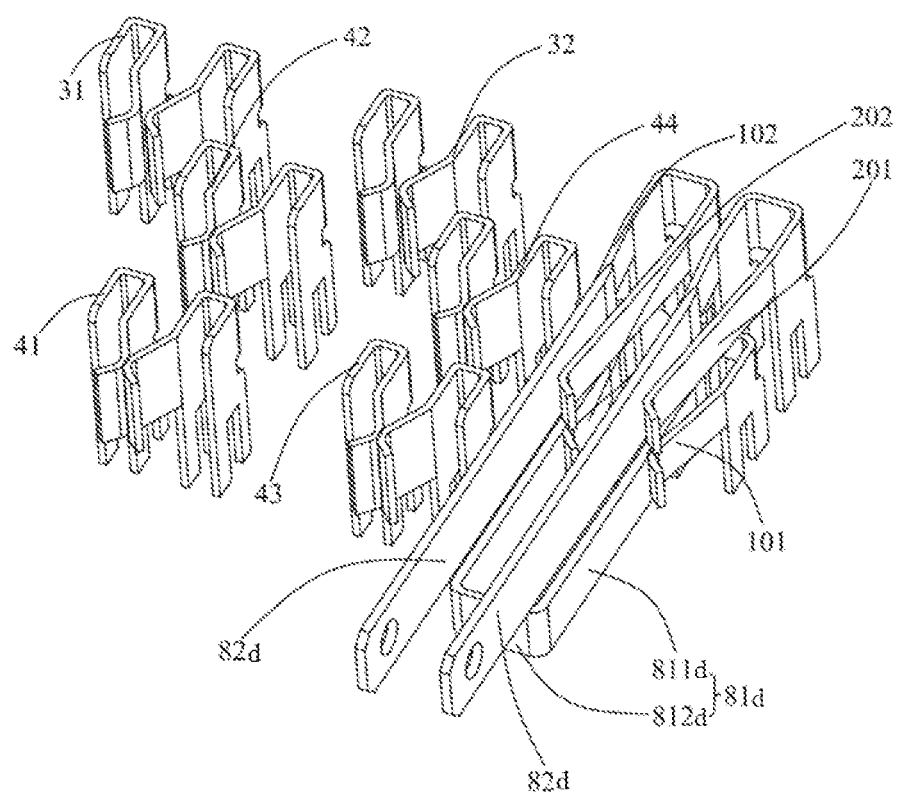
FIG. 6 is a schematic view of a structure of the electric energy storage device when matched with a medium-voltage plug, according to the first embodiment.
Figure 7:
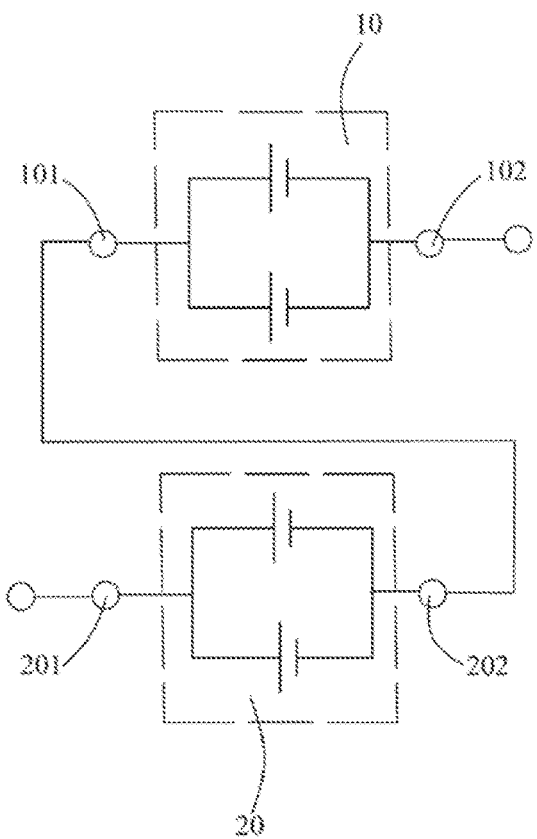
FIG. 7 is a schematic view of a circuit of the electric energy storage device when matched with a medium-voltage plug, according to the first embodiment.
Figure 8:
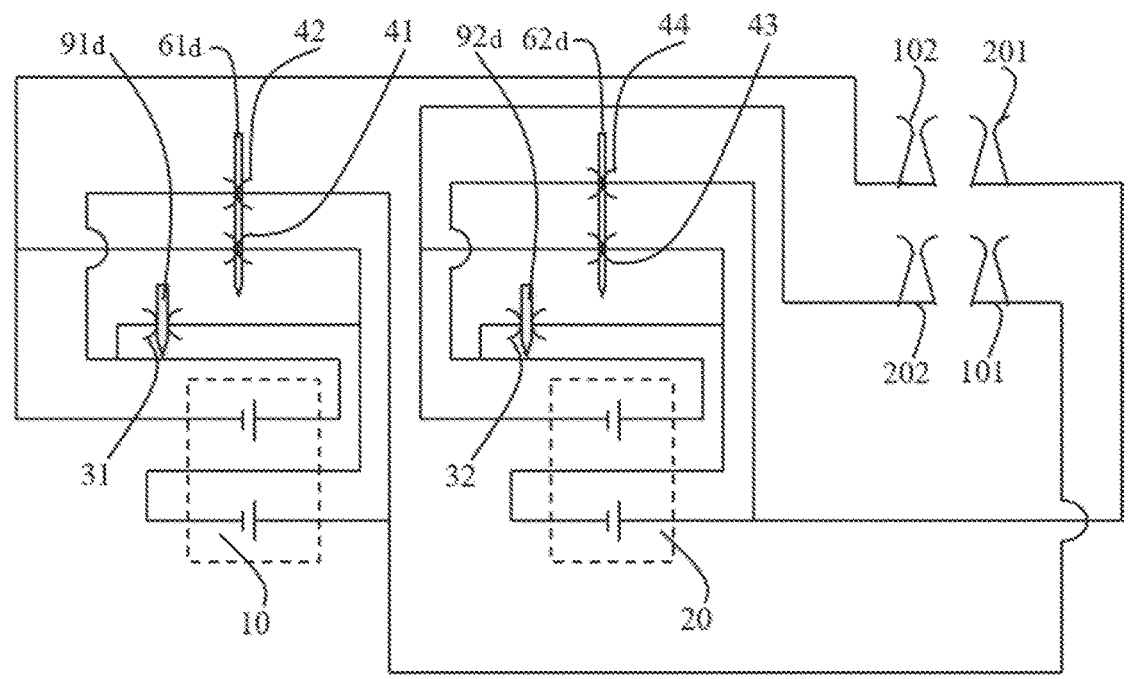
FIG. 8 is a schematic view of a connection of the electric energy storage device when matched with a high-voltage plug, according to the first embodiment
Figure 9:
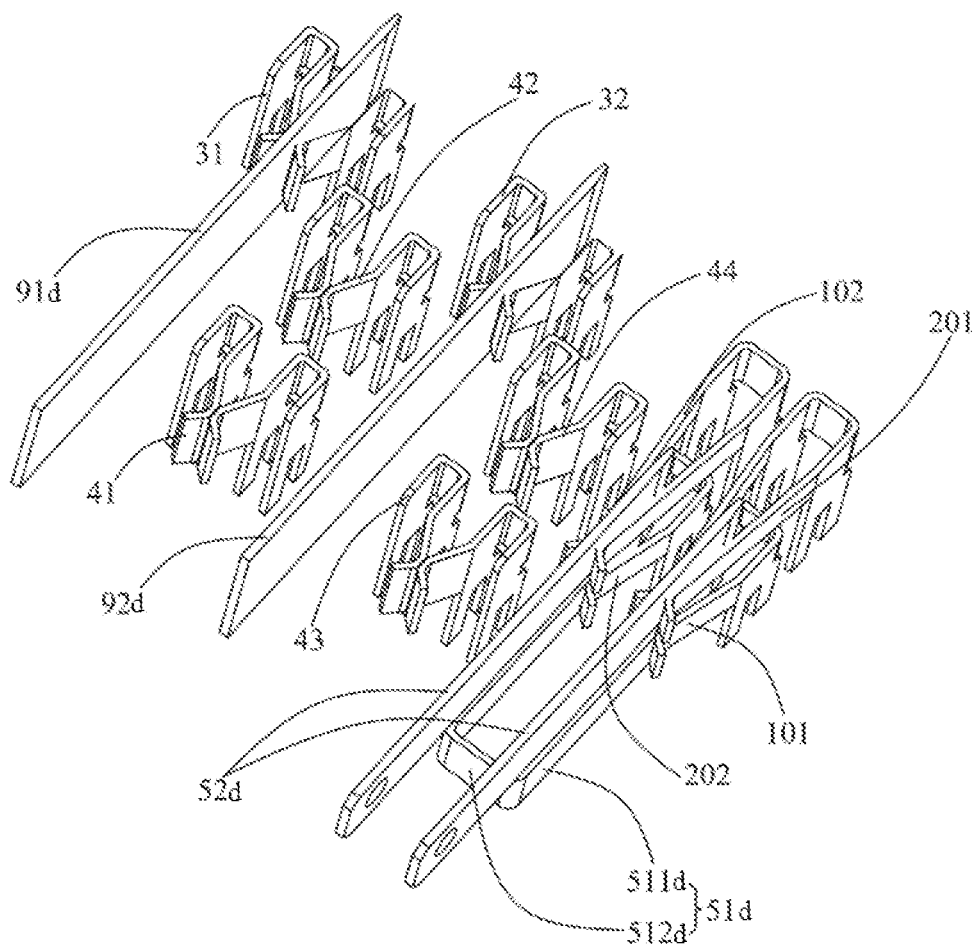
FIG. 9 is a schematic view of a structure of the electric energy storage device when matched with a high-voltage plug, according to the first embodiment.

Please refer to FIG. 6 in combination with FIG. 1, a medium-voltage electric tool (not shown) is provided with a medium-voltage plug (not shown) that is matched with the socket of the electric energy storage device and its working voltage is 2 nV. The medium-voltage plug is provided with a first connecting piece 81d and two second connecting pieces 82d. The first connecting piece 81d is provided with two contact arms 811d and a connecting arm 812d which connects the two contact arms 811d, so as to connect two of the four voltage terminals corresponding to different energy modules 10 and 20 with different polarities. The two second connecting pieces 82d are in a single monolithic structure, which is used to connect the remaining two voltage terminals, and serve as the voltage input terminals of the medium-voltage plug In this embodiment, the first connecting piece 81d is located in the lower row, and the two second connecting pieces 82d are located in the upper row. When the medium-voltage plug of the medium voltage electric tool is connected with the socket, the second connecting piece 82d connects the first positive terminal 101 and the second negative terminal 202 located in the lower row, and the two contact arms 811d of the first connecting piece 81d are respectively connected with the second positive terminal 201 and the first negative terminal 102 in the upper row, so that the two energy modules 10 and 20 are connected in series. The two energy units in each energy module 10 and 20 are connected in parallel through the control part, and output medium voltage of 2 nV. The corresponding circuit diagram is shown in FIG. 7.

Please refer to FIG. 8 to FIG. 11 in combination with FIG. 1, a high-voltage electric tool (not shown) is provided with a high-voltage plug that matched with the socket of the electric energy storage device and its working voltage is 4 nV. The high-voltage plug is provided with a switching part matched with the control part and an output part matched with the four voltage output terminals.

The high-voltage plug is further provided with a base (not labeled) and a switching part. The switching part includes a first switching part and a second switching part corresponding to the first control part and second control part. The first switching part includes a first insulating part 61d and a first conductive part 91d. The first insulating part 61d is set corresponding to a normally closed switch which is turned on. In this embodiment, The first insulating part 61d is set corresponding to the first parallel switch 41 and the second parallel switch 42. The first conductive part 91d is set corresponding to the normally open switch which is turned off, in this embodiment, it is set corresponding to the first series switch 31. Correspondingly, the second switching part includes a second insulating part 62d corresponding to the third parallel switch 43 and the fourth parallel switch 44 and a second conductive part 92d corresponding to the second series switch 32.

When the high-voltage plug is connected with the socket, the first insulating part 61d of the first switching part contacts the first parallel switch 41 and the second parallel switch 42, so that the first parallel switch 41 and the second parallel switch 42 are disconnected. The first conductive part 91*d* is in contact with the two contact parts of the first series switch 31, so that the first series switch 31 is conductive and the connection of the two energy units in the energy module 10 are switched from parallel state to series state. The second insulating part 62*d* of the second switching part is in contact with the third parallel switch 43 and the fourth parallel switch 44, so that the third parallel switch 43 and the fourth parallel switch 44 are disconnected, and the second conductive part 92*d* is in contact with the two contact parts of the second series switch 32, so that the second series switch 32 is conductive, and the connection of the two energy units in the energy module 20 are switched from parallel state to series state, which means that the connection of the two energy units in each energy module 10, 20 is switched from parallel state to series state through the switching part, so that the output voltage of each energy module 10 is 2 nV.

The structure of the output part of the high-voltage plug is similar with the one of the previous medium-voltage plug, including a third connecting piece 51*d* and two fourth connecting pieces 52*d*. The third connecting piece 51*d* is provided with two contact arms 511*d* and a connecting arm 512*d* connecting the two contact arms 511*d*, which is used to connect two of the four voltage terminals corresponding to the different energy modules 10 and 20 with different polarities. The two fourth connecting pieces 52*d* are monolithic structure, which is used to respectively connect the remaining two voltage output terminals, and serve as the voltage input terminals of the medium-voltage plug. The specific structure of the third connecting piece 51*d* can refer to the first connecting piece 81*d* of the medium-voltage plug, and the specific structure of the fourth connecting piece 51*d* can refer to the second connecting piece 82*d* of the medium-voltage plug.

Figure 11:
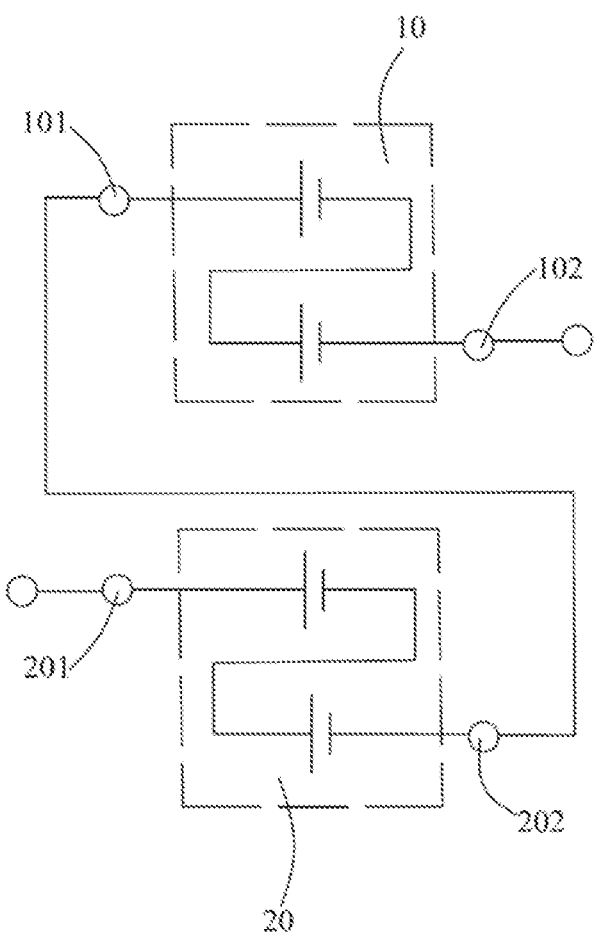
FIG. 11 is a schematic view of a circuit of the electric energy storage device when matched with the high-voltage plug, according to the first embodiment.

In this embodiment, the third connecting piece 51*d* is located in the lower row, and the two fourth connecting pieces 52*d* are located in the upper row. When the high-voltage plug of the high-voltage electric tool is connected with the socket, the third connecting piece 51*d* connects the first positive terminal 101 and the second negative terminal 202 located in the lower row, and the two fourth connecting pieces 52*d* are respectively connected to the second positive terminal 201 and the first negative terminal 102 located in the upper row, so that the two energy modules 10 and 20 are connected in series. In combination with the content mentioned above, the connection of the two energy units in each energy module 10, 20 is switched from parallel state to series state through the switching part of the high-voltage plug, which means that all four energy units are connected in series, and output high voltage of 4 nV. FIG. 11 is the corresponding circuit diagram.

Second Embodiment

Figure 12:
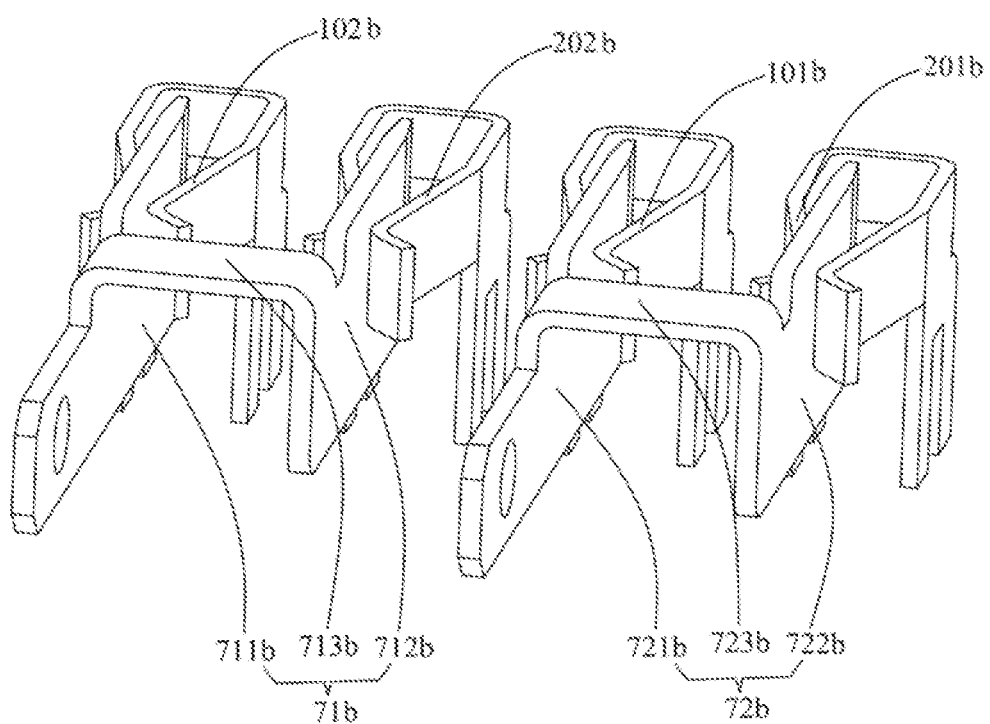
FIG. 12 is a schematic view of a structure of the electric energy storage device when matched with a low-voltage plug, according to a second embodiment.
Figure 13:
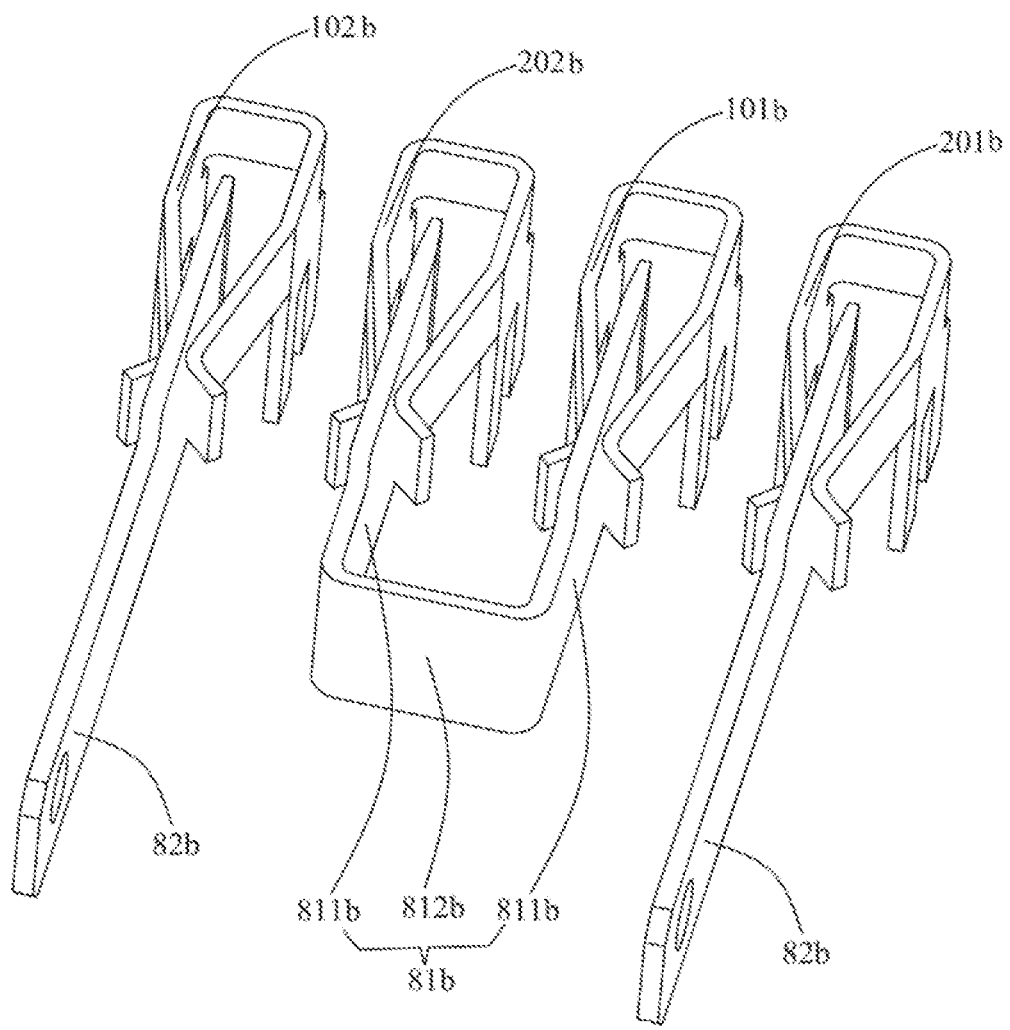
FIG. 13 is a schematic view of a structure of the electric energy storage device when matched with a medium-voltage plug, according to the second embodiment.

Please refer to FIG. 12 and FIG. 13, the electric energy storage device in the second embodiment is basically the same as the electric energy storage device in the first embodiment. Please refer to the related content in the first embodiment. The difference between the second embodiment and the first embodiment is only the different arrangement of the voltage output terminals. The four voltage output terminals 101*b*, 102*b*, 201*b*, 202*b* of the socket in the second embodiment are arranged horizontally in a row, which are successively the first negative terminal 102*b*, the second negative terminal 202*b*, the first positive terminal 101*b*, and the second positive terminal 201*b*. The corresponding structure of the plugs of each electric tool needs to be adjusted accordingly.

Please refer to FIG. 12 in combination with FIG. 5, a low-voltage electric tool (not shown) is provided with a low-voltage plug (not shown) and its working voltage is nV. The low-voltage plug is provided with two connecting pieces 71*b*, 72*b*, and the structures of the two connecting pieces 71*b*, 72*b* are the same. The first connecting piece 71*b* is provided with two contact arms 711*b*, 712*b* and a connecting arm 713*b* connecting the two contact arms 711*b*, 712*b*; the second connecting piece 72*b* is provided with two contact arms 721*b*, 722*b* and a connecting arm 723*b* connecting the two contact arms 721*b*, 722*b*. The contact arms 711*b*, 712*b*, 721*b*, and 722*b* are in insert-structures. The two connecting pieces 71*b* and 72*b* also serve as the voltage input terminals of the low-voltage plug at the same time.

When the low-voltage plug is connected with the socket, the two contact arms 711*b*, 712*b* of the first connecting piece 71*b* are respectively in contact with the first negative terminal 102*b* and the second negative terminal 202*b*, and the two contact arms 721*b*, 722*b* of the second connecting piece 72*b* are respectively in contact with the first positive terminal 101*b* and the second positive terminal 201*b*, so that the two energy modules 10*b*, 20*b* are connected in parallel. The two energy units in the energy modules 10*b* and 20*b* are connected in parallel through a control part to output low voltage of nV to the electric tool. The circuit connection of the four energy units can refer to FIG. 5.

Please refer to FIG. 13 in combination with FIG. 7, a medium-voltage electric tool (not shown) is provided with a medium-voltage plug (not shown) and its working voltage is 2 nV. The medium-voltage plug is provided with a first connecting piece 81*b* and two second connecting pieces 82*b* arranged on both sides of the first connecting piece 81*b*. The first connecting piece 81*b* is provided with two contact arms 811*b* and a connecting arm 812*b* connecting the two contact arms 811*b*. Each of the second connecting pieces 82*b* is provided with a contact arm (not numbered). And the structure of all the contact arms is monolithic.

When the medium-voltage plug is connected with the electric energy storage device, the two contact arms 811*b* of the first connecting piece 81*b* are respectively in contact with the second negative terminal 202*b* and the first positive terminal 101*b* and are connected through the connecting arm 812*b*. The two second connecting pieces 82*b* are respectively in contact with the first negative terminal 102*b* and the second positive terminal 201. So that the two energy modules 10*b* and 20*b* are controlled in series connection, and the two energy units in a same energy module are connected in parallel through the control part, so as to output a medium voltage of 2 nV to the electric tool. The circuit connection of the four energy units can refer to FIG. 7

It is understandable that a high-voltage electric tool (not shown) is provided with a high-voltage plug (not shown) and its working voltage is 4 nV. The high-voltage plug is provided with a switching part matched with the control part and an output part matched with the four voltage output terminals. The matching relationship and interaction between the switching part and the control part are basically the same as the one when the high-voltage plug is connected in the first embodiment, so that the connection mode of the two energy units in the energy modules 10*b* and 20*b* are switched from parallel state to series state, which can refer to FIG. 10 and will not be repeated here. The structure of the output part and its matching relationship with the four voltage output terminals are basically the same as the medium-voltage plug and its matching relationship with the four voltage output terminals in the second embodiment. The energy modules 10b and 20b are connected in series, which can refer to the FIG. 13, and will not be repeated here. The high-voltage plug connects four energy units in series to output a high-voltage of 4 nV to the electric tool. The corresponding circuit diagram can be shown in FIG. 11.

Third Embodiment

Figure 14:
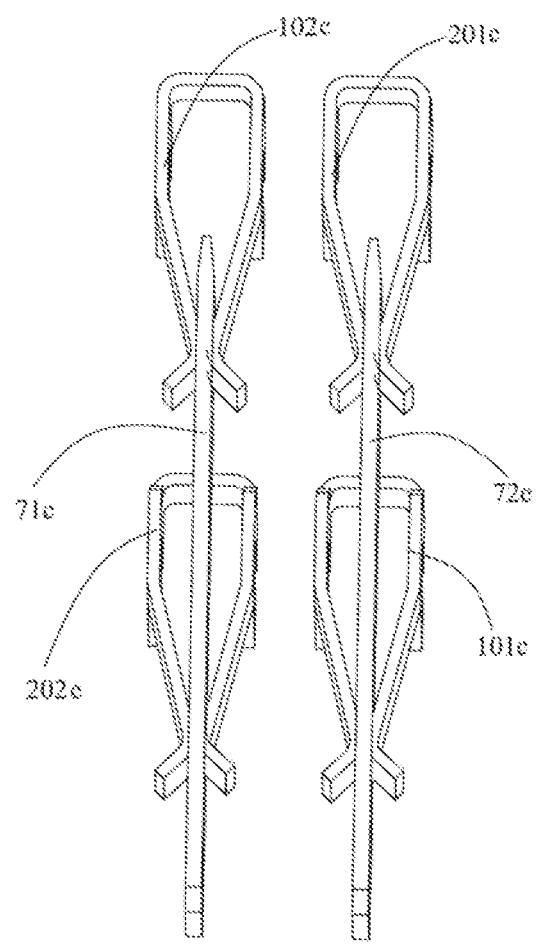
FIG. 14 is a schematic view of a structure of the electric energy storage device when matched with a low-voltage plug, according to a third embodiment.
Figure 15:
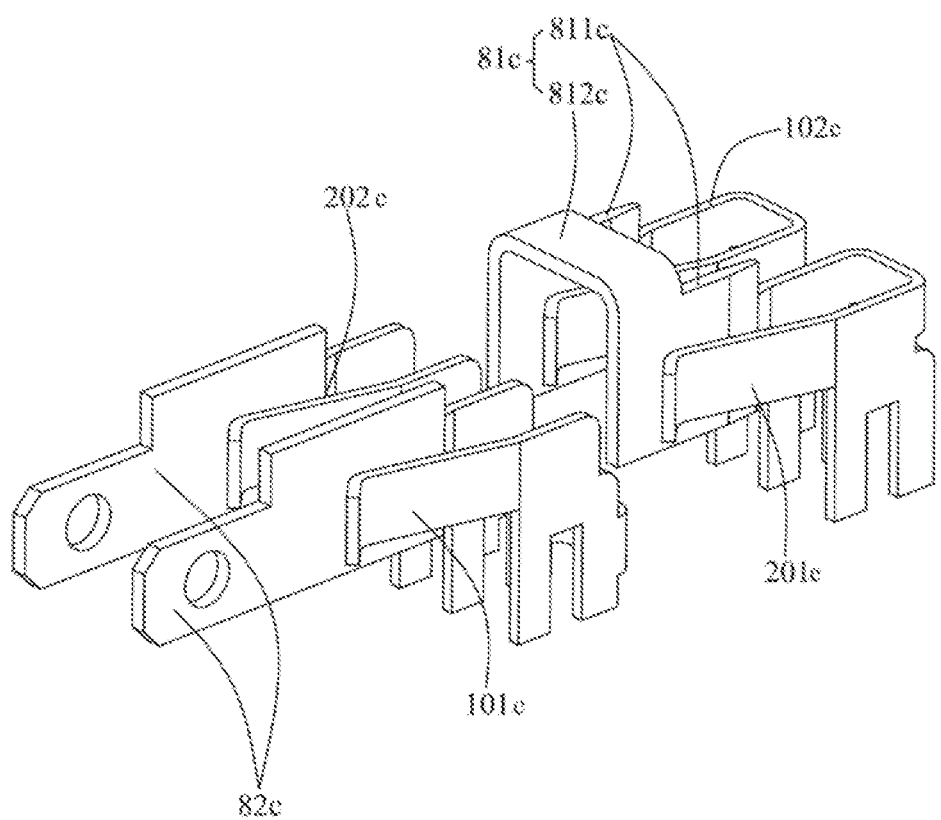
FIG. 15 is a schematic view of a structure of the electric energy storage device when matched with a medium-voltage plug, according to the third embodiment.

Please refer to FIG. 14 to FIG. 15, the electric energy storage device in the third embodiment is basically the same as the electric energy storage device in the first embodiment, which can refer to the related content in the first embodiment. The difference between the third embodiment and the first embodiment is only the different arrangement of voltage output terminals. In the third embodiment, the four voltage output terminals 101c, 102c, 201c, 202c are divided into two rows and two columns, which are not arranged in the upper and lower rows, but in the front and rear rows, and the ones with same polarity are arranged in one column. In this embodiment, the first negative terminal 102c and the second positive terminal 201c are located in one row, and the second negative terminal 202c and the first positive terminal 101c are located in the other row.

Please refer to FIG. 14 in combination with FIG. 5, a low-voltage electric tool (not shown) is provided with a low-voltage plug (not shown) and its working voltage is nV. The low-voltage plug is provided with two connecting pieces 71c, 72c, and the structure of the two connecting pieces 71c and 72c are monolithic.

When the low-voltage plug is matched with the electric energy storage device, the first connecting piece 71c is in contact with the first negative terminal 102c and the second negative terminal 202c to connect the first negative terminal 102c and the second negative terminal 202c; the second connecting piece 72c is in contact with the first positive terminal 101c and the second positive terminal 201c to connect the first positive terminal 101c and the second positive terminal 201c. So that the two energy modules 10c, 20c can be controlled in in parallel connection; and the two energy units in the energy modules 10c and 20c are connected in parallel through the control part to output low voltage of nV to the low-voltage electric tool. The corresponding circuit diagram can be refer to FIG. 5.

Please refer to FIG. 15 in combination with FIG. 7, a medium-voltage electric tool (not shown) is provided with a medium-voltage plug (not shown) and its working voltage is 2 nV. The medium-voltage plug is provided with a first connecting piece 81c arranged in a first row and two second connecting pieces 82c arranged in a second row. The first connecting piece 81c and the second connecting piece 82c are not in contact with each other. The first connecting piece 81c is provided with two contact arms 811c and a connecting arm 812c connecting the two contact arms 811c.

When the medium-voltage plug is matched with the electric energy storage device, the two contact arms 811c of the first connecting piece 81c are respectively in contact with the first negative terminal 102c and the second positive terminal 201c and are connected through the connecting arm 812c. The two second connecting pieces 82c are respectively in contact with the second negative terminal 202c and the first positive terminal 101c in the second row. So as to control the two energy modules 10c and 20c to be connected in series, and the two energy units in the two energy modules 10c and 20c are connected in parallel through the control part to output the medium voltage of 2 nV to the medium-voltage electric tool. The corresponding circuit diagram can refer to in FIG. 7.

Please refer to FIG. 15, a high-voltage electric tool (not shown) is provided with a high-voltage plug (not shown) and its working voltage is 4 nV. The high-voltage plug is provided with a switching part matched with the control part and an output parts matched with the four voltage output terminals. The matching relationship and interaction between the switching part and the control part are basically the same as those of the high-voltage plug used in the first embodiment, which can switch the two energy units in the energy modules 10c and 20c from parallel state to series state, please refer to FIG. 10 and the content will not be repeated here. The structure of the output part and its matching relationship with the four voltage output terminals are basically the same as the medium-voltage plug and matching relationship of the medium-voltage plug and the four voltage output terminals in the third embodiment, so that the energy modules 10c and 20c are connected in series and it will not be repeated here. So that the high-voltage plug connects four energy units in series to output a high-voltage of 4 nV to the electric tool. The corresponding circuit diagram can refer to FIG. 11.

It should be noted that the initial state of the series switch and the parallel switch of the control part in the first to third embodiments can be set and arranged according to needs, and should not be specifically limited.

It should also be noted that, in order to explain the disclosure more clearly, in the embodiments mentioned above, the switching part of the plug is provided with an insulating part corresponding to each normally closed switch, and is provided with a conductive part corresponding to each normally open switch. For example, referring to FIG. 8, the high-voltage plug in the first embodiment is provided with two conductive parts 91d and 92d which are respectively matched with the two series switches 31, 32, and two insulating parts 61d, 62d which are correspondingly matched with the four parallel switches 41, 42, 43, 44.

Figure 10:
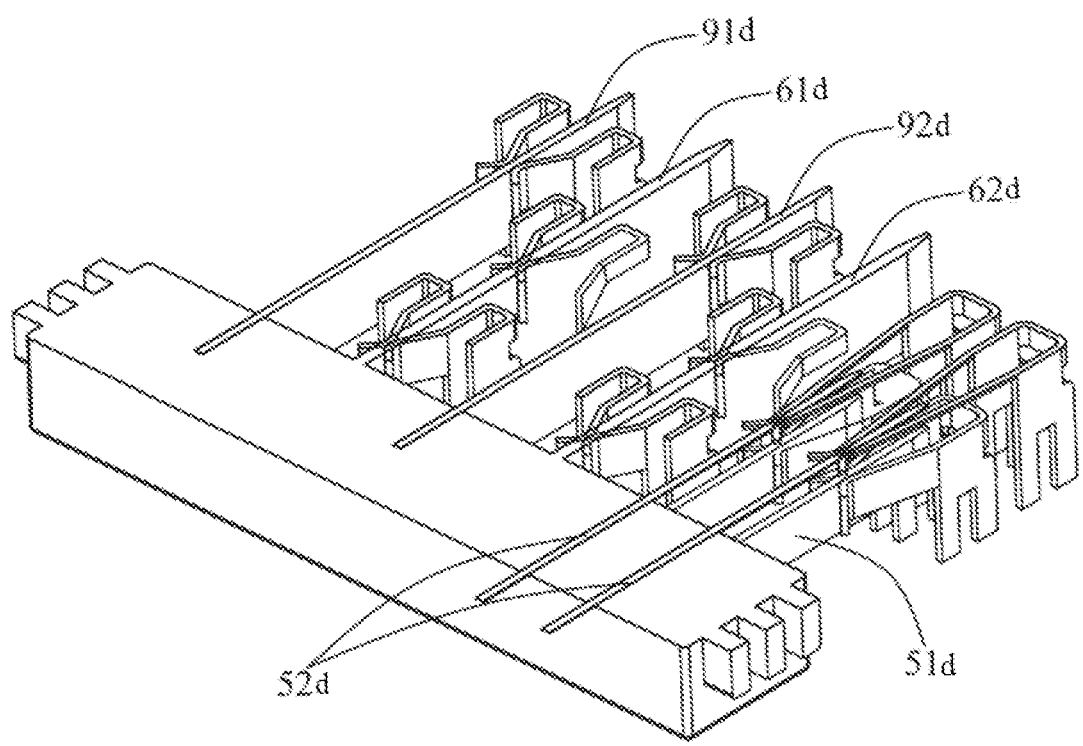
FIG. 10 is a schematic view of the electric energy storage device when matched with the high-voltage plug, according to the first embodiment.
Figure 16:
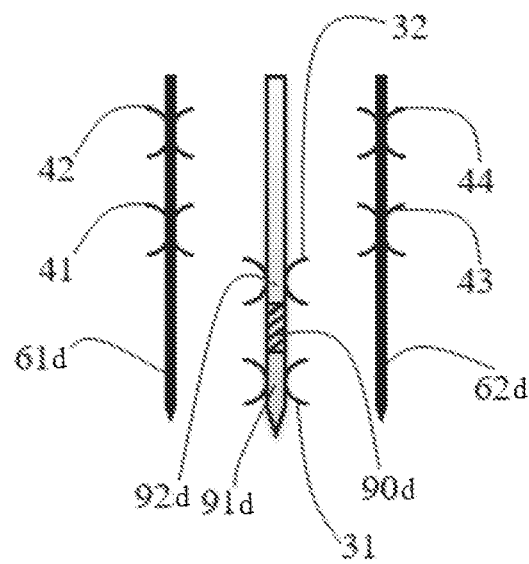
FIG. 16 is a schematic view of a structure when an insulating part and a conductive part are separated.
Figure 17:
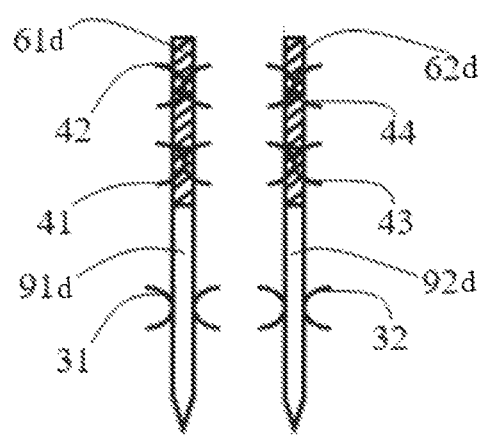
FIG. 17 is a schematic view of a structure in which an insulating part and a conductive part are integrated.

It is understandable that the conductive part and the insulating part in the first to third embodiments can be arranged separately, or can be arranged integrally on one insulating base, which is as shown in FIG. 10; the two conductive parts 91d and 92d can also be arranged together and the adjacent conductive parts 91d and 92d are separated by an insulating part 90d. Accordingly, the two parallel switches 41 and 42 can be arranged in the same column, which is as shown in FIG. 16. The conductive part and the insulating part can also be arranged integrally, for example, as shown in FIG. 17, one section of the integration, an insulating part 61d, is made of insulating material, and another section of the integration, a conductive section 91d, is made of conductive material. Correspondingly, the parallel switches 41, 42 and the series switches 31 are arranged in the same column, and the parallel switches 43, 44 and the series switch 33 are arranged in the same column. Each insulating part can be arranged integrally or partially integrally, and each insulating part 61d, 62d is disconnected from the two parallel switches 41, 42 simultaneously. In one word, the insulation part and the conductive part can be arranged according to the arrangement of the series switches and the parallel switches of the electric energy storage device. The arrangements are various, which are not listed here. Those skilled in the art should understand that the changes of the arrangements are within the scope of protection of this

Fourth Embodiment

Figure 18:
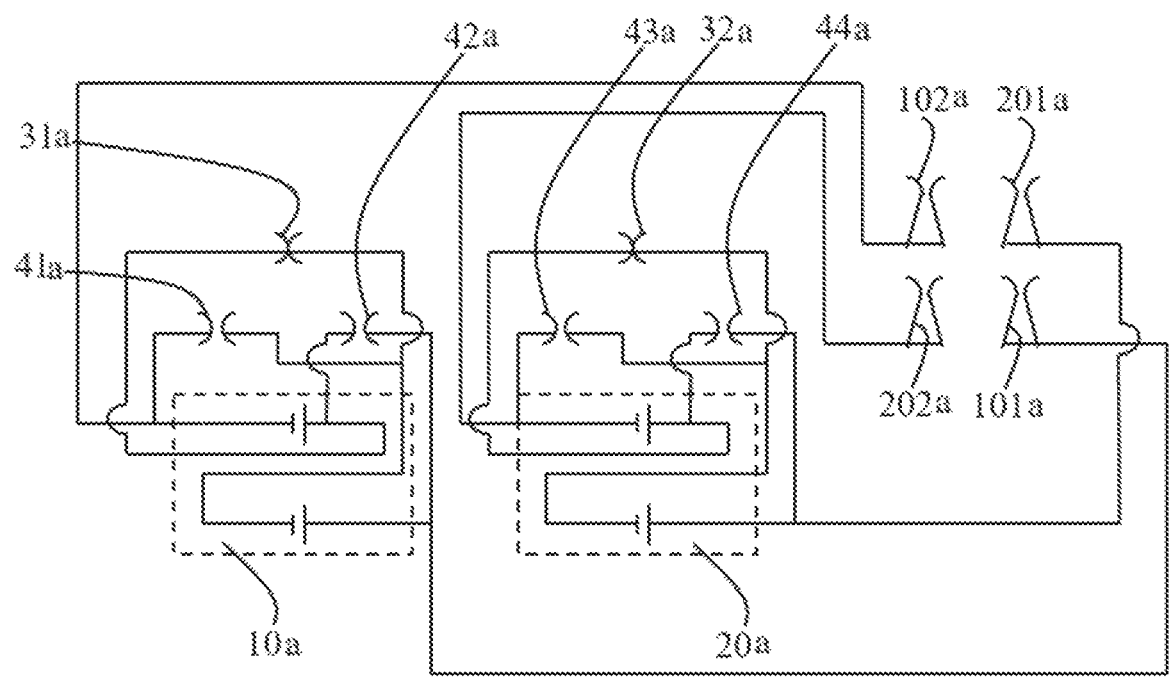
FIG. 18 is a schematic view of a connection of the four energy units of the electric energy storage device, according to a fourth embodiment.
Figure 19:
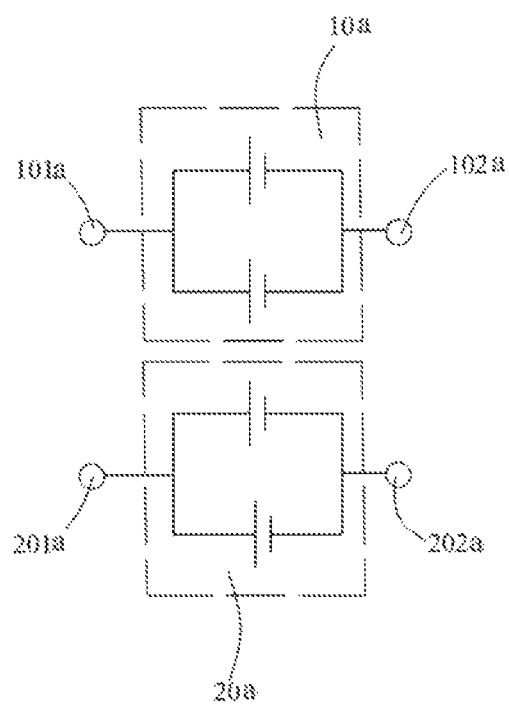
FIG. 19 is a schematic view of an initial circuit connection of the four energy units of the electric energy storage device, according to the fourth embodiment.

Please refer to FIG. 18 and FIG. 19, the disclosure also provides a fourth embodiment. The energy storage device includes two energy modules 10a, 20a, and each energy module 10a, 20a includes two energy units. The socket is also provided with the first control part and the second control part respectively corresponding to the energy modules 10a and 20a. The first control part includes a first series switch 31a, a first parallel switch 41a and a second parallel switch 42a. The second control part includes a second series switch 32a, a third parallel switch 43a and a fourth parallel switch 44a. As shown in FIG. 1 in combination with the first embodiment, the energy storage device in the fourth embodiment is different from the energy storage device in the previous three embodiments in the connection of the energy units, and the difference is that its two series switches 31a and 32a are normally closed switches and in conductive state, and the parallel switches 41a, 42a, 43a, 44a are normally open switches and in disconnected state. In an initial state, the two energy units in the energy modules 10a, 20a are connected in series.

The socket of the energy storage device is provided with four voltage output terminals, which are respectively: a first positive terminal 101a and a first negative terminal 102a correspondingly connected to the positive and negative electrodes of the energy module 10a, and a second positive terminal 201a and a second negative terminal 202a correspondingly connected to the positive and negative electrodes of the energy module 20a.

In this embodiment, two series switches 31a, 32a are arranged in the front row, four parallel switches 41a, 42a, 43a, 44a are arranged in the rear row, each series switch 31a, 32a and each parallel switch 41a, 42a, 43a and 44a are arranged in one column separately; the four voltage output terminals are also located in the rear row, which are arranged in two rows simultaneously.

Figure 20:
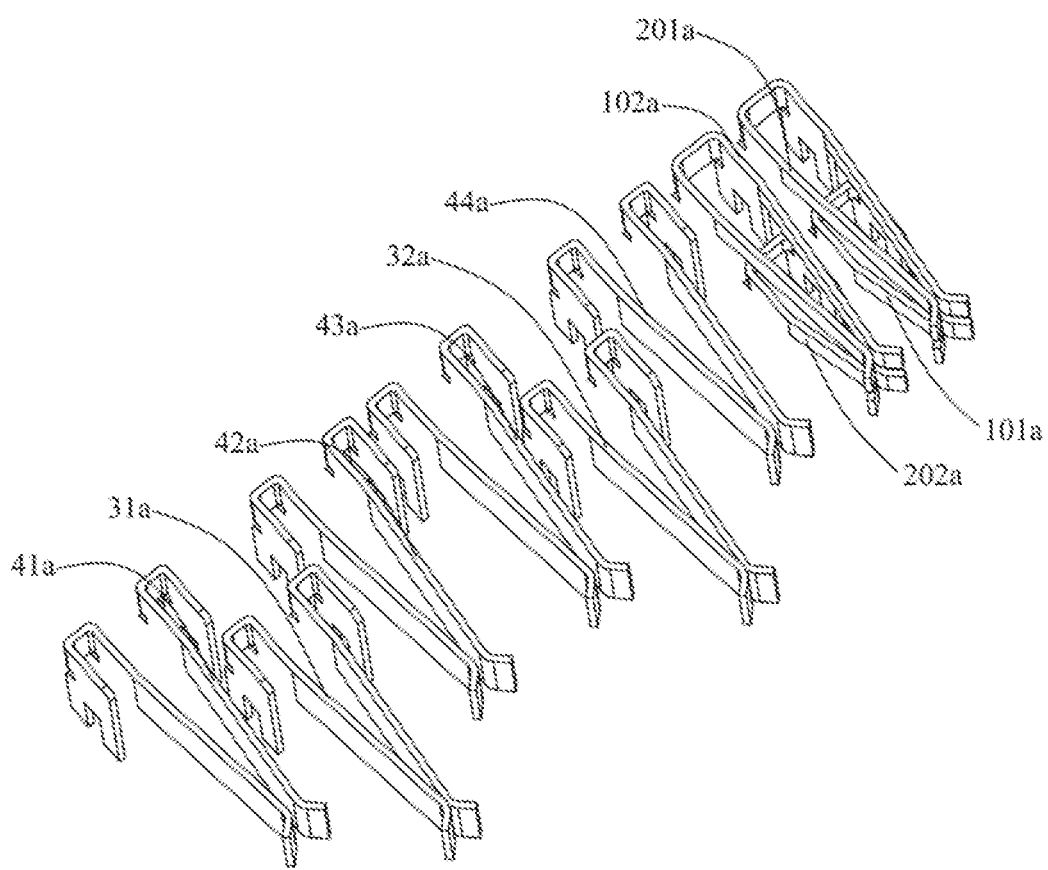
FIG. 20 is a terminal arrangement view of the electric energy storage device, according to the fourth embodiment.

Please refer to FIG. 20, the four parallel switches 41a, 42a, 43a, 44a and the two series switches 31a, 32a are arranged in a row, which are successively the first parallel switch 41a, the first series switch 31a, and the second parallel switch 42a, the third parallel switch 43a, the second series switch 32a and the fourth parallel switch 44a. The four voltage output terminals 101a, 102a, 201a, and 202a are arranged in two rows up and down, which are respectively the first negative terminal 102a and the second positive terminal 201a arranged in the upper row, and the second negative terminal 202a and the first positive terminal 101a arranged in the lower row.

Figure 21:
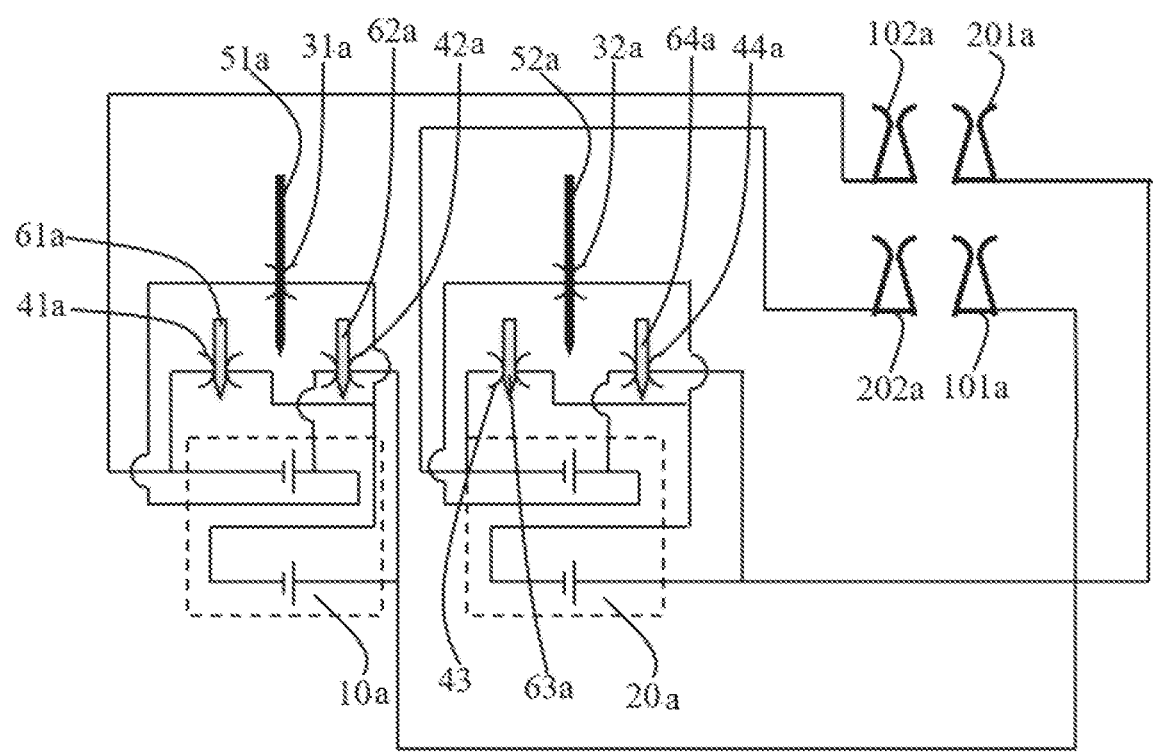
FIG. 21 is a schematic view of the circuit of the electric energy storage device when matched with a low-voltage plug, according to the fourth embodiment.
Figure 22:
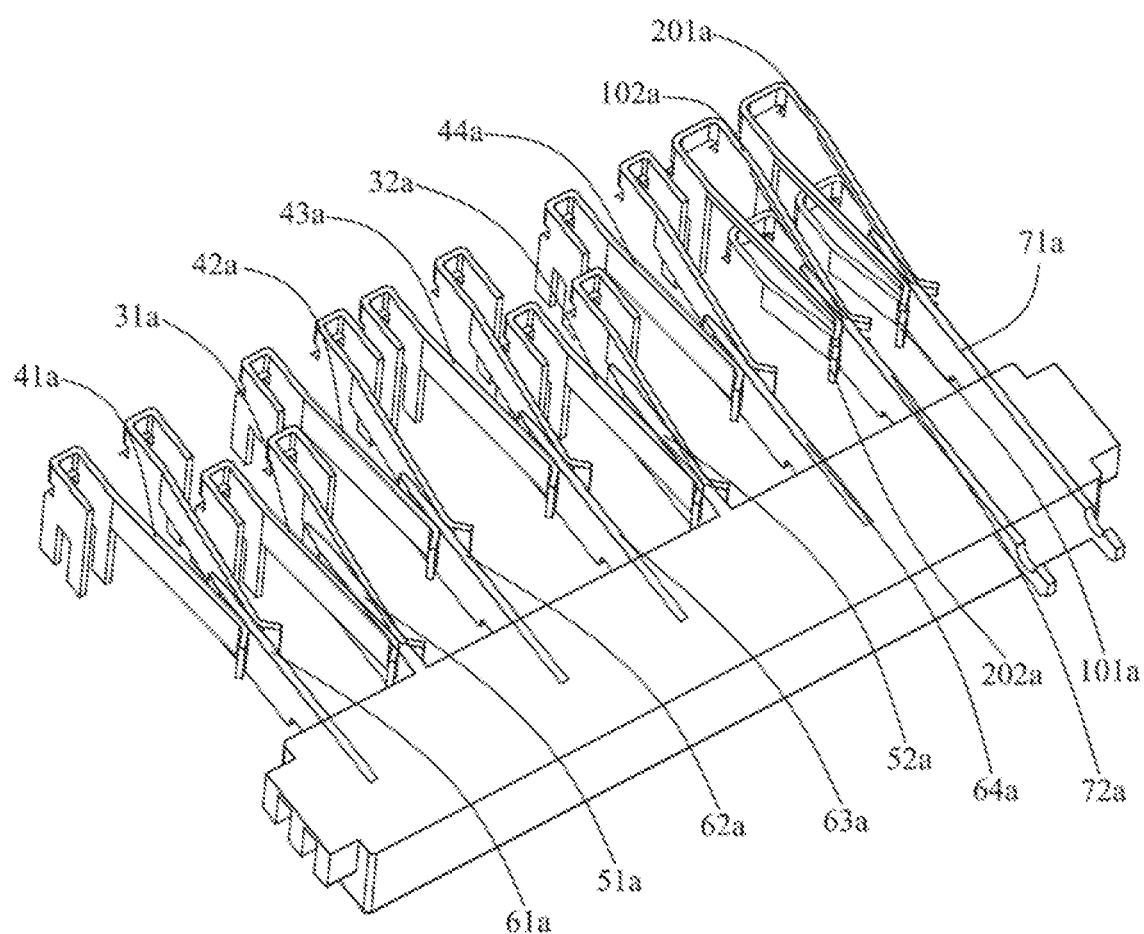
FIG. 22 is a schematic section view of the electric energy storage device when matched with a low-voltage plug, according to the fourth embodiment.
Figure 23:
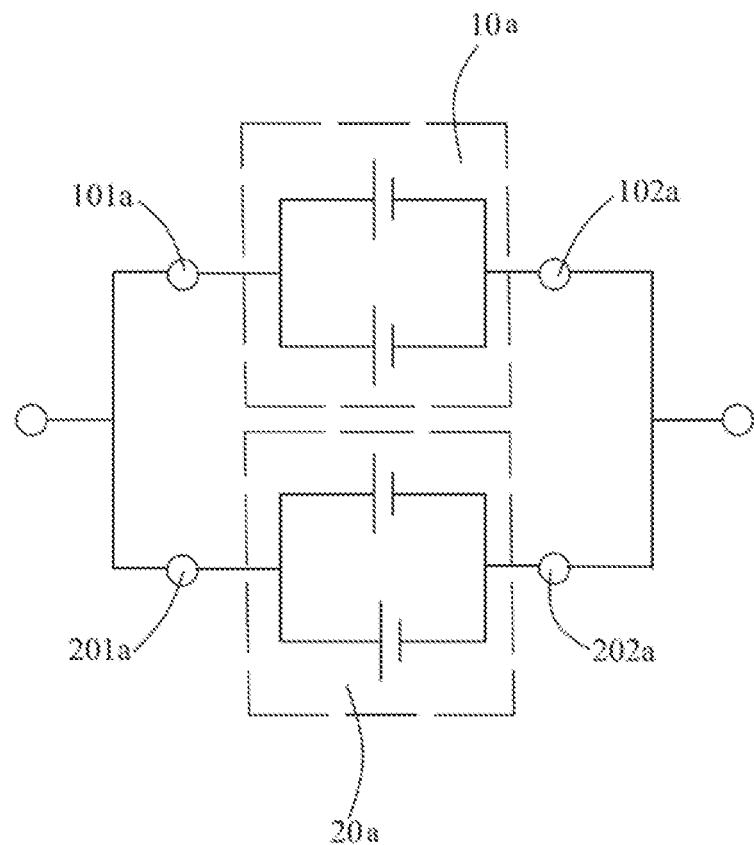
FIG. 23 is a schematic view of a circuit of the electric energy storage device when matched with a low-voltage plug, according to the fourth embodiment.

Please refer to FIGS. 21 to 23 in combination with FIG. 20, a low-voltage electric tool is provided with a low-voltage plug and its working voltage is nV. The low-voltage plug is provided with two switching parts matched with two control parts and an output part matched with four voltage output terminals 101a, 102a, 201a, 202a. The output part includes two connecting pieces 71a, 72a, and the connecting pieces 71a, 72a are in a single monolithic structure. The switching part includes an insulating part and a conductive part. The insulating part is set corresponding to the normally closed switch which are in disconnected state, and in this embodiment, it is set corresponding to the series switch. The conductive part is set corresponding to the normally open switch which are in conductive state, and in this embodiment, it is set corresponding to the parallel switch. The insulating part includes two insulating parts 51a, 52a, which are respectively arranged and matched with the two series switches 31a, 32a. The conductive parts 61a, 62a, 63a, and 64a are respectively arranged and matched with the four parallel switches 41a, 42a, 43a, and 44a.

When the low-voltage plug is matched with the electric energy storage device, the four conductive parts 61a, 62a, 63a, 64a of the switching part respectively conduct the parallel switches 41a, 42a, 43a, 44a, and the two insulating parts 51a, 52a of the switching part respectively disconnect series switches 31a, 32a, so as to change the connection state of the two energy units in the energy modules 10a, 20a from series state to parallel state. For the specific matching method of the switching part and the control part, please refer to the first embodiment, which will not be repeated here. The first connecting piece 71a is connected to the first positive terminal 101a and the second positive terminal 201a, and the second connecting piece 72a is connected to the first negative terminal 102a and the second negative terminal 202a, so that the two energy modules 10 and 20 are connected in parallel. Therefore, the electric energy storage device outputs a low voltage of nV for the low-voltage electric tool. The circuit diagram is shown in FIG. 23.

Figure 24:
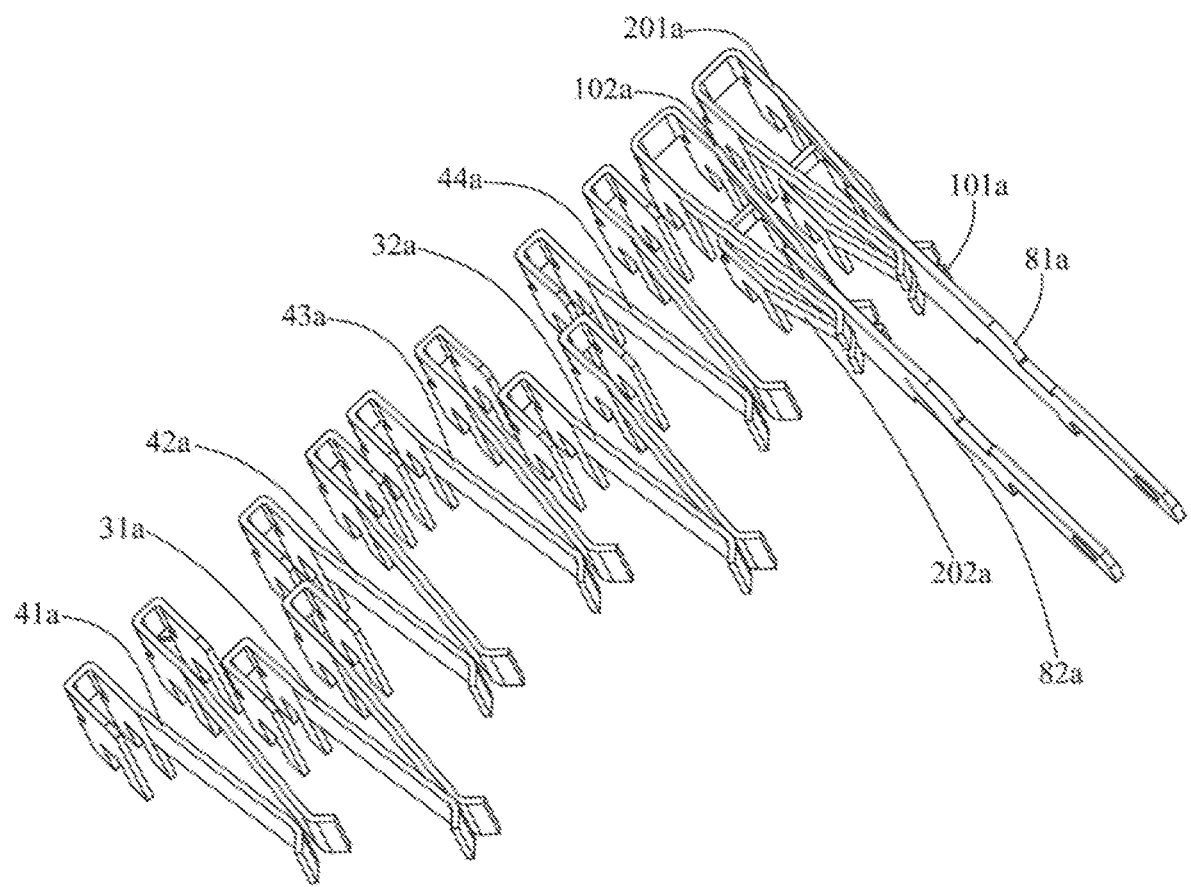
FIG. 24 is a schematic view of a structure of the electric energy storage device when matched with a medium-voltage plug, according to the fourth embodiment.
Figure 25:
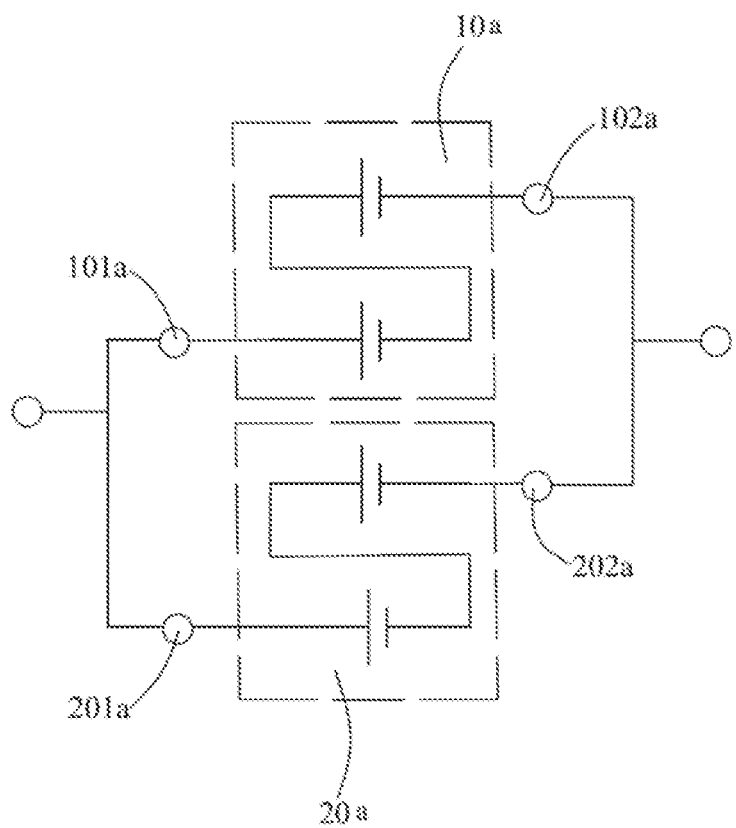
FIG. 25 is a schematic view of a circuit of the electric energy storage device when matched with a medium-voltage plug, according to the fourth embodiment.

Please refer to FIGS. 24 to 25 in combination with FIG. 20, a medium-voltage electric tool is provided with a medium-voltage plug and its working voltage is 2 nV. The medium-voltage plug is provided with two connecting pieces 81a, 82a, and the connecting pieces 81a, 82a are in a monolithic structure. When the medium-voltage plug is matched with the electric energy storage device, the connecting pieces 81a, 82a connect the two energy modules 10a, 20a in parallel, and the specific method of the parallel connection between the connecting pieces 81a, 82a and the four voltage terminals 101a, 102a, 201a, 202a can refer to the first embodiment, which will not be repeated here. The two energy units in the energy modules 10a and 20a are connected in series through the control part. Therefore, the electric energy storage device outputs a medium voltage of 2 nV to the electric tool. The circuit diagram is shown in FIG. 25.

Figure 26:
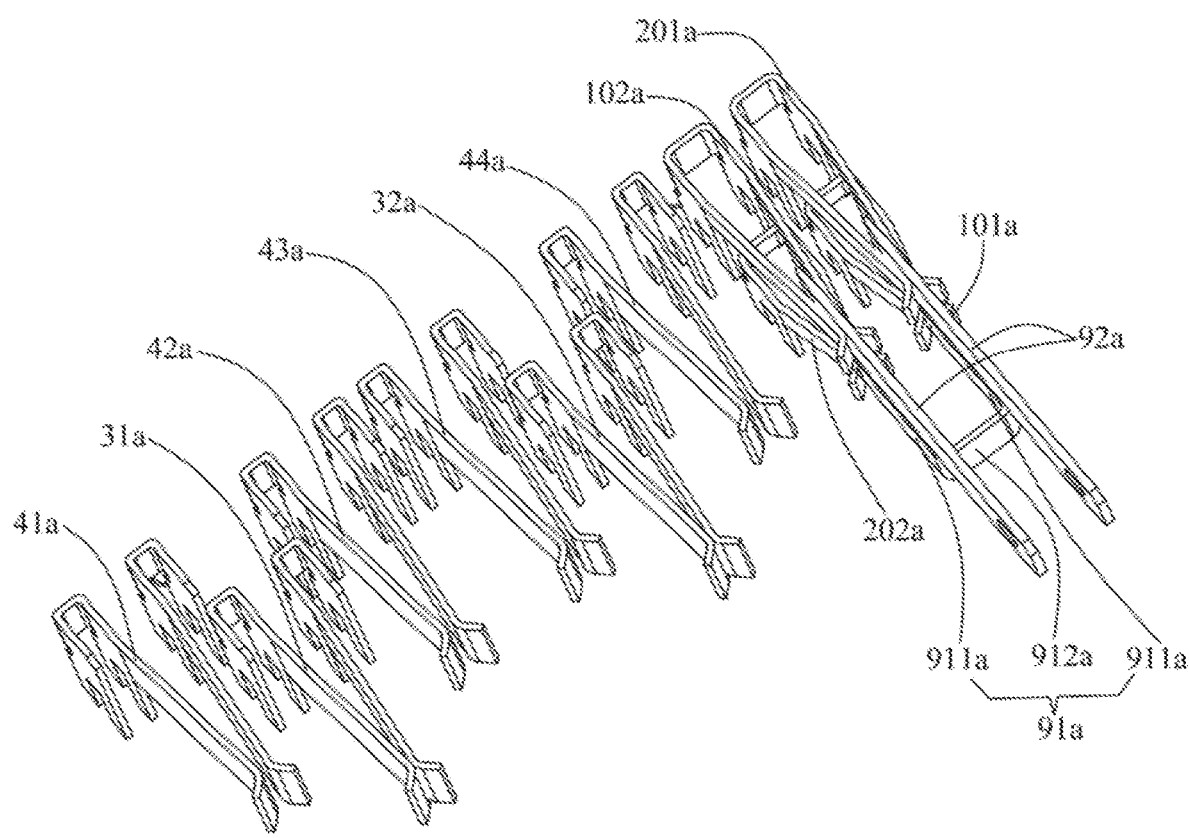
FIG. 26 is a schematic view of a structure of the electric energy storage device when matched with a high-voltage plug, according to the fourth embodiment.
Figure 27:
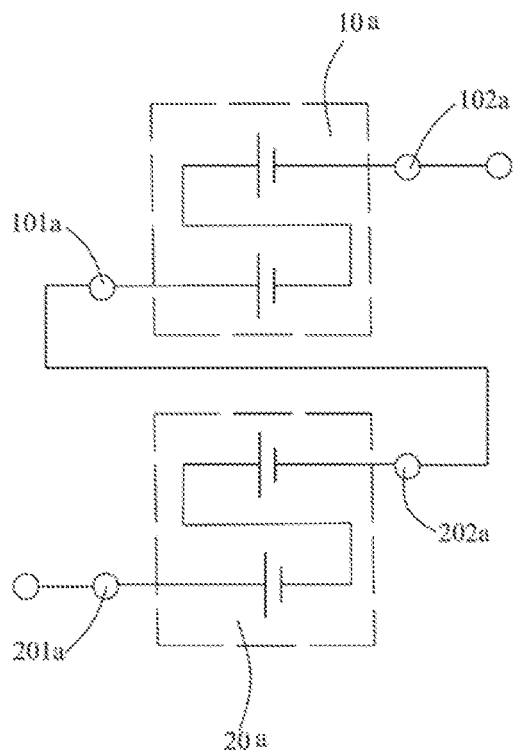
FIG. 27 is a schematic view of a circuit of the electric energy storage device when matched with a high-voltage plug, according to the fourth embodiment.

Please refer to FIG. 26 to FIG. 27, a high-voltage electric tool is provided with a high-voltage plug and its working voltage is 4 nV. The high-voltage plug is provided with a first connecting piece 91a and two second connecting pieces 92a. The first connecting piece 91a is provided with two contact arms 911a and a connecting arm 912a connecting the two contact arms 911a. When the high-voltage plug is matched with the electric energy storage device, the connecting pieces 91a, 92a connect the two energy modules 10a, 20a in series, and the specific method of the series connection between the connecting pieces 91a, 92a and the four voltage terminals 101a, 102a, 201a, 202a can refer to the first embodiment, which will not be repeated here. The two energy units in the energy modules 10a and 20a are connected in series through the control part to output a high voltage of 4 nV to the high-voltage electric tool. The circuit diagram is shown in FIG. 27.

The four voltage terminals 101a, 102a, 201a, and 202a in the fourth embodiment can be arranged in a row, which is similar to the one in the second embodiment, and the arrangement of the connecting pieces of the corresponding plug can be adjusted accordingly and can refer to the second embodiment, which will not be repeated here.

The four voltage terminals 101a, 102a, 201a, 202a in the fourth embodiment can be arranged in the front and the rear rows, which is similar to the one in the third embodiment, the arrangement of the connecting pieces of the corresponding plug can be adjusted accordingly and can refer to the third embodiment, which will not be repeated here.

Fifth Embodiment

Figure 28:
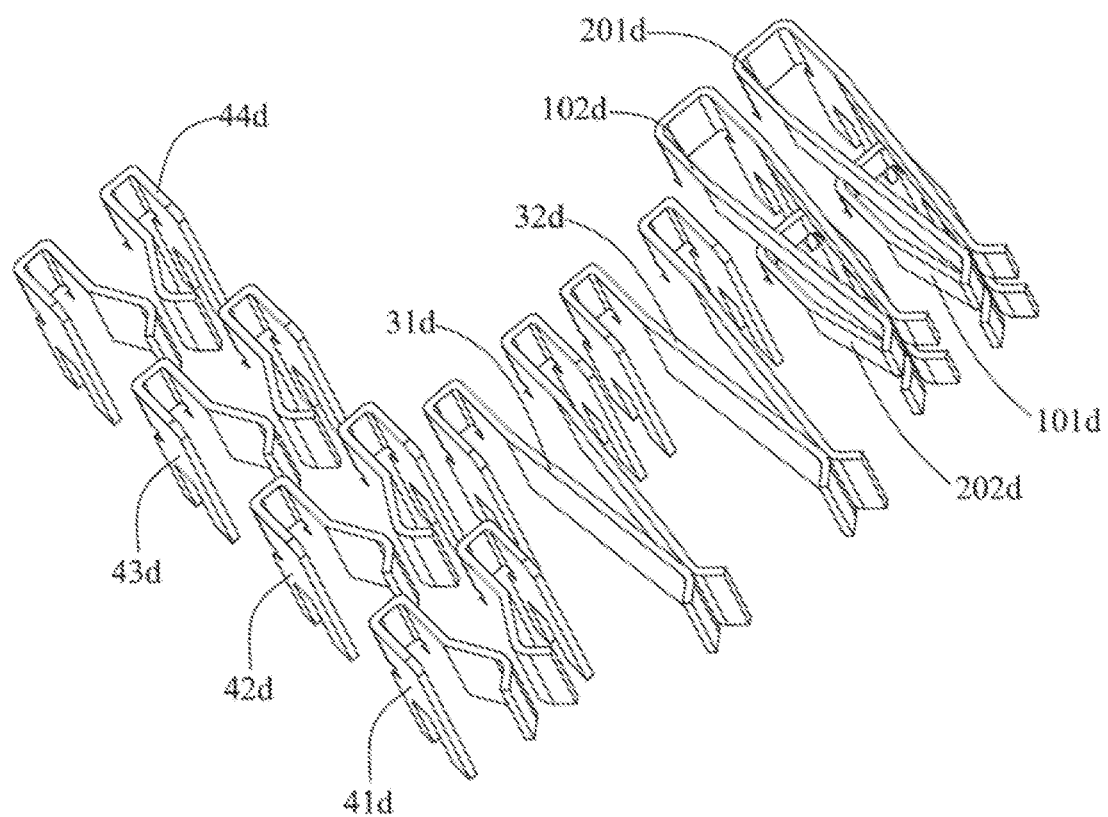
FIG. 28 is a terminal arrangement view of the electric energy storage device, according to a fifth embodiment.

Please refer to FIG. 28, the energy storage device includes two energy modules, each energy module includes two energy units. The energy storage device in the fifth embodiment is basically the same as the energy storage device in the fourth embodiment, which can be combined with FIG. 20. The difference between the energy storage device in the fifth embodiment and the energy storage device in the fourth embodiment is only that the four parallel switches of the control part of the energy storage device are arranged in one column, and the two series switches are arranged in two columns. Specifically, the four parallel switches 41$d$, 42$d$, 43$d$, and 44$d$ are arranged in the first columns and in front and rear, and the two series switches 31$d$ and 32$d$ are separately arranged in the second column and the third column. The four voltage output terminals 101$d$, 102$d$, 201$d$, and 202$d$ are arranged in two columns and two rows, which are respectively a first negative terminal 102$d$ and a second positive terminal 201$d$ in the upper row, and a second negative terminal 202$d$ and a first positive terminal 101$d$ in the lower row, which is the same as the one in the fourth embodiment and the related content can refer to the fourth embodiment. The parallel switches 41$d$, 42$d$, 43$d$, and 44$d$ are normally open switches, and the two series switches 31$d$ and 32$d$ are normally closed switches. Initially, the two energy units in the two energy modules 10$d$ and 20$d$ are connected in series.

Figure 29:
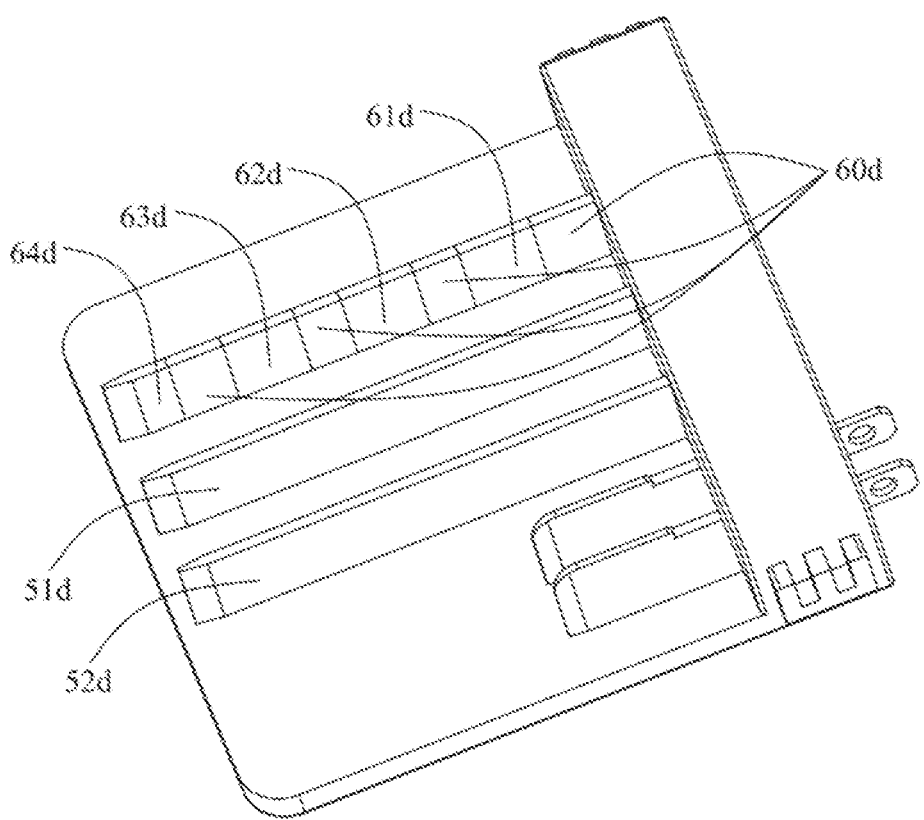
FIG. 29 is a schematic view of the structure of the electric energy storage device when matched with a low-voltage plug, according to the fifth embodiment.
Figure 30:
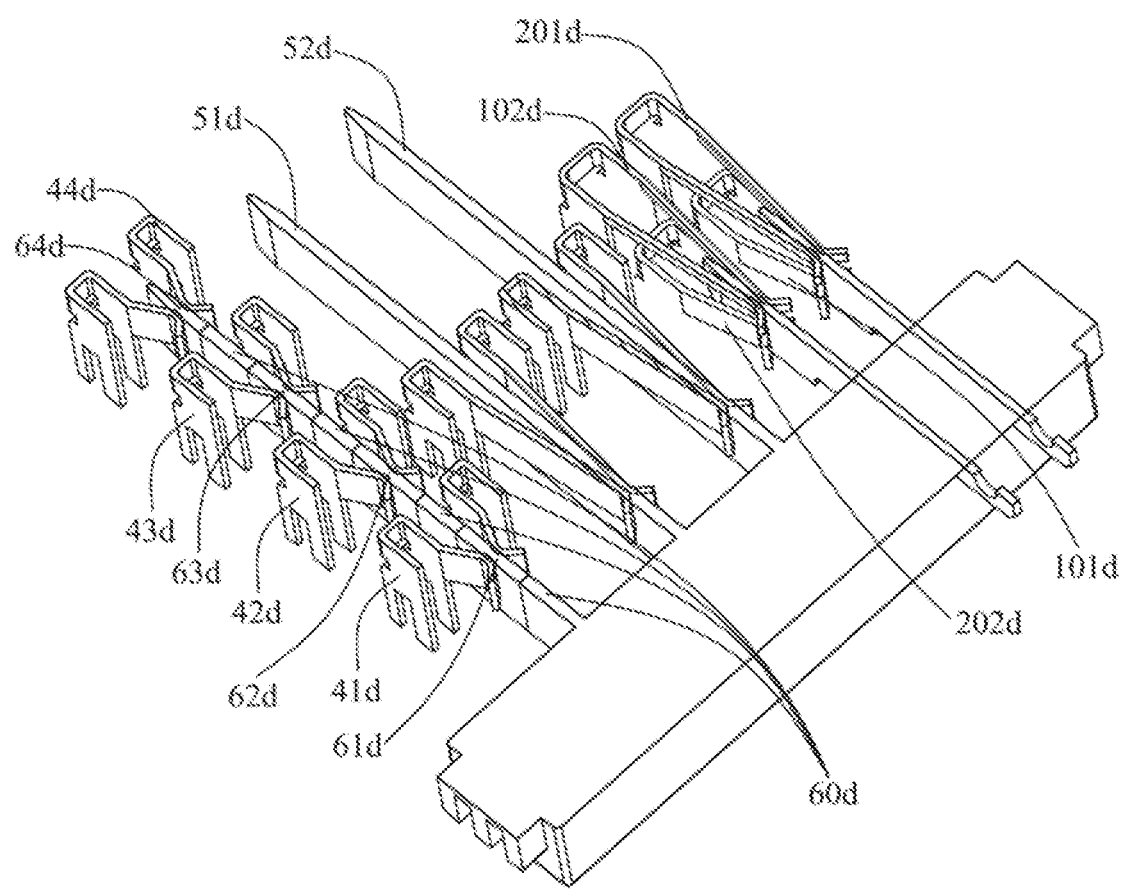
FIG. 30 is a schematic section view of the electric energy storage device when matched with a low-voltage plug, according to the fifth embodiment

Please refer to FIG. 29 and FIG. 30, a low-voltage electric tool is provided with a low-voltage plug and its working voltage is nV. The low-voltage plug is provided with a switching part and an output part matched with the four voltage output terminals 101$d$, 102$d$, 201$d$, and 202$d$. The switching part includes a conductive part corresponding to the parallel switches 41$d$, 42$d$, 43$d$, and 44$d$, and an insulating part corresponding to the series switches 31$d$, 32$d$. The insulating part includes insulating parts 51$d$ and 52$d$ respectively matched with the series switches 31$d$ and 32$d$; the conductive part includes conductive parts 61$d$, 62$d$, 63$d$, 64$d$ corresponding to the four parallel switches 41$d$, 42$d$, 43$d$, 44$d$. The conductive parts 61$d$, 62$d$, 63$d$, and 64$d$ are arranged together, and an insulating separating part 60$d$ which is made of insulating material is arranged between adjacent conductive parts to avoid the electric connection among the conductive parts 61$d$, 62$d$, 63$d$ and 64$d$, which may cause the internal short circuit of the electric energy storage device. When the low-voltage plug is matched with the electric energy storage device, the insulating parts 51$d$ and 52$d$ of the switching part respectively disconnect the series switches 31$d$ and 32$d$, and the conductive parts 61$d$, 62$d$, 63$d$ and 64$d$ respectively conduct the parallel switches 41$d$, 42$d$, 43$d$ and 44$d$, so that the connection of the energy units in the energy modules 10$d$ and 20$d$ are changed from series state to parallel state. The output part of the low-voltage plug is provided with two connecting pieces, which can connect the energy modules 10$d$ and 20$d$ in parallel to output low voltage of nV to the electric tool. The structure of the low-voltage plug and its matching relationship of the four voltage output terminals are basically the same as the one in the fourth embodiment, which will not be repeated here.

A medium-voltage electric tool is provided with a medium-voltage plug and its working voltage is 2 nV. The connecting piece of the medium-voltage plug connects the energy modules 10$d$ and 20$d$ in parallel, and the two energy units in the energy modules 10$d$ and 20$d$ are connected in series to output medium voltage of 2 nV to the medium-voltage electric tool. The structure of the medium voltage plug and its matching relationship with the four voltage output terminals are basically the same as the structure of the medium voltage plug and the manner of matching with the four voltage output terminals in the fourth embodiment, and will not be repeated here.

A high-voltage electric tool is provided with a high-voltage plug and its working voltage is 4 nV. The connecting piece of the high-voltage plug connects the energy modules 10$d$ and 20$d$ in series and the two energy units in the energy modules 10$d$ and 20$d$ are connected in series through the control part to output medium voltage of 4 nV to the medium-voltage electric tool. The structure of the high-voltage plug and its matching relationship of the four voltage output terminals are basically the same as the one in the fourth embodiment, which will not be repeated here.

It should be noted that the four voltage output terminals of the fifth embodiment can also be arranged in one row in the second embodiment or in two rows in the front and rear of the third embodiment. And the corresponding adjustment of the connecting piece of the low-voltage plug, the medium-voltage plug and the high-voltage plug can respectively refer to the one in the second embodiment and the third embodiment, so that the low-voltage plug and the medium-voltage plug can connect two energy modules in parallel, and the high-voltage plug can connect two energy modules in series.

It should be noted that the series switch and the parallel switch of the control part in the fourth to the fifth embodiment can be arranged according to needs, and should not be limited to this. For example, four parallel switches of two control parts can be arranged in one row, and two series switches of two control parts can be arranged in one row; or the four parallel switches and two series switches of the two control parts are arranged in one row; or the four parallel switches of the two control parts are arranged in two rows and in each row there are two parallel switches, and the two series switches of the two control parts are arranged in one row; or the two parallel switches and one series switch of one control part are arranged in one row, and the two parallel switches and one series switch of the other control part are arranged in one row. In one word, the arrangement of parallel switches and series switches of the electric energy storage device are various, which are not listed here. Those skilled in the art should understand that the changes of the arrangement are all within the protection scope of this patent.

Figure 31:
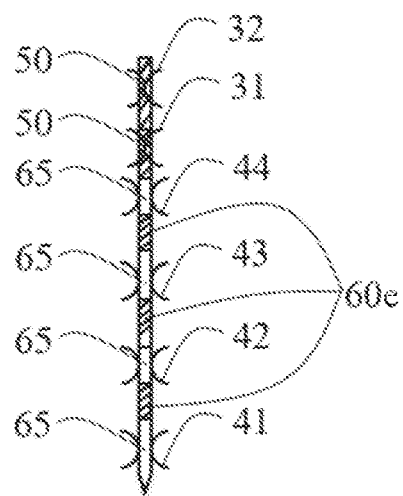
FIG. 31 is a schematic view of the structure when the insulating part and the conductive part are all integrated.
Figure 32:
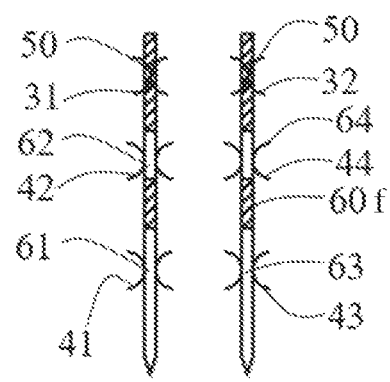
FIG. 32 is a schematic view of the structure when the insulating part and the conductive part are partially integrated.

It should also be noted that, in order to explain the disclosure more clearly, the switching part in the embodiment mentioned above is provided with an insulating part corresponding to each normally closed switch, and a conductive part is provided corresponding to each normally open switch. It is understandable that the insulating part and the conductive part here can be separately arranged, or can be fully integrated or partially integrated into one body. For example, as shown in FIG. 31: there is an kind of insert that one section thereof is an insulating part 50 made of insulating material, and one section thereof is a conductive part 65 made of conductive material; and the two insulating parts 50 corresponding to two normally closed switches that are series switches 31 and 32 and the four conductive parts 65 corresponding to the four normally open switches that are parallel switches 41, 42, 43, 44 are all integrally set as 60$e$. Or the insulating part 50, the first conductive part 61 and the second conductive part 62 of one control part are integrally arranged, and the other insulating part 50, the third conductive part 63 and the fourth conductive part 64 are integrally arranged as 60f. In one word, the insulation part and the conductive part can be arranged according to the arrangement of parallel switches and series switches of the electric energy storage device. The arrangements are various, and will not be listed here. Those skilled in the art should understand that the arrangement changes are all within the scope of protection of this patent.

In addition, it should be noted that the normally closed switch means that in the initial state, its two contact parts are in contact to each other to connect the electrodes electrically connected with the two contact parts in a conductive state, and the connection state of the two contact parts can be changed by the action of foreign objects, which changes the two contact parts switch from the conductive state to the disconnected state, for example, a normally closed terminal. The normally open switch means that in the initial state, its two contact parts are disconnected to disconnect the electrodes electrically connected with the two contact parts in a disconnected state, and the connection state of the two contact parts can be changed by the action of foreign objects, which changes the two contact parts switch from the disconnected state to the conductive state, for example, a normally open terminal. Of course, the normally open switch is not limited to a normally open terminal, and the normally closed switch is not limited to a normally closed terminal. The one that can achieve the same function are all within the protection scope of this disclosure.

In summary, an electric energy storage device includes four energy units with the same rated voltage. The four energy units are equally divided into two energy modules, each energy module is provided a control part. In an initial state, the control unit connects two energy units in one energy module in parallel. Through using different plugs to connect to the electric energy storage device, the four energy units are all connected in parallel, or in series, or the energy units in one module are connected in series or parallel, and the energy modules are connected in series or in parallel, so as to output one of at least three output voltages to the electric tool of the electric energy storage device. This arrangement increases the application range of the electric energy storage device and reduces the cost.

The above embodiments are only used to illustrate the technical solutions of the disclosure but not to limit them. Although the disclosure is described in detail with reference to the preferred embodiments, those of ordinary skill in the art should understand that the technical solutions of the disclosure can be modified or equivalently replaced, without departing from the spirit and scope of the technical solution of the disclosure.

What is claimed is:

1. An electric tool system, comprising:
   an electric energy storage device having:
      four energy units with a same rated voltage, wherein the four energy units are divided into two energy modules, each energy module is provided with two energy units, and each energy module is provided with a positive electrode and a negative electrode, and
      a socket including four voltage output terminals respectively connected to the positive and negative electrodes of the two energy modules, and the socket is also provided with two control parts which respectively control the two energy units in the two corresponding energy modules to switch between parallel state and series state; and
   a plug connected to the socket, wherein the plug is provided with several connecting pieces connected to the four voltage output terminals to connect the two energy modules in parallel or series; wherein
   the control part is provided with two parallel switches and one series switch, the parallel switches connect the two energy units in the corresponding energy module in parallel, and the series switch connects the two energy units in the corresponding energy module in series, and
   one kind of the parallel switches and the series switch is a normally closed switch, and the other kind is a normally open switch,
   the plug is provided with a switching part matching with the control part, and
   the switching part includes an insulating part corresponding to the normally closed switch and a conductive part corresponding to the normally open switch, the insulating part disconnects the normally closed switch, and the conductive part turns on the normally open switch to switch the connection state of the two energy units in the energy module.

2. The electric tool system according to claim 1, wherein the plug includes several conductive parts, the several conductive parts are arranged in an integral structure, and an insulating separating part is provided between adjacent conductive parts.

3. The electric tool system according to claim 1, wherein the conductive part and the insulating part of the switching part corresponding to the same control part are arranged in an integrated structure; or
   the conductive part or the insulating part of the plug corresponding to different control parts is arranged in an integrated structure; or
   all the conductive parts and all the insulating parts of the switching part corresponding to the two control parts are arranged in an integral structure.

4. The electric tool system according to claim 1, wherein the plug includes two connecting pieces, and
   each connecting piece is in contact with the two voltage output terminals with a same polarity, and the connecting pieces are in a single-piece structure or a double-contact arm structure.

5. The electric tool system according to claim 1, wherein the plug includes three connecting pieces, wherein
   one of the connecting pieces is provided with a double contact arm and is respectively in contact with the two voltage output terminals with different polarities corresponding to different energy modules, and
   the other two connecting pieces are in contact with the other two voltage output terminals.

6. An electric tool system, comprising:
   an electric energy storage device having:
      four energy units with a same rated voltage, wherein the four energy units are divided into two energy modules, each energy module is provided with two energy units, and each energy module is provided with a positive electrode and a negative electrode, and
      a socket including four voltage output terminals respectively connected to the positive and negative electrodes of the two energy modules, and the socket is also provided with two control parts which respectively control the two energy units in the two corresponding energy modules to switch between parallel state and series state; and a low-voltage electric tool provided with a low-voltage plug which is connected with the socket to make the four energy units in a full parallel state;

a medium-voltage electric tool with a medium-voltage plug which is connected with the socket, so that each two of the four energy units are series connected first and then parallel connected therebetween or each two of the four energy units are parallel connected first and then series connected therebetween;

a high-voltage electric tool with a high-voltage plug which is connected with the socket to make the four energy units in a full series state; wherein the control part is provided with two parallel switches and one series switch, the parallel switches connect the two energy units in the corresponding energy module in parallel, and the series switch connects the two energy units in the corresponding energy module in series, and one kind of the parallel switches and the series switch is a normally closed switch, and the other kind is a normally open switch, the plug is provided with a switching part matching with the control part, and the switching part includes an insulating part corresponding to the normally closed switch and a conductive part corresponding to the normally open switch, the insulating part disconnects the normally closed switch, and the conductive part turns on the normally open switch to switch the connection state of the two energy units in the energy module.

* * * * *